United States Patent
Shinjo et al.

(10) Patent No.: US 12,442,794 B2
(45) Date of Patent: Oct. 14, 2025

(54) MOLECULAR SENSOR, MOLECULAR DETECTION DEVICE, AND MOLECULAR DETECTION METHOD

(71) Applicant: Kabushiki Kaisha Toshiba, Tokyo (JP)

(72) Inventors: Yasushi Shinjo, Kawasaki Kanagawa (JP); Hirohisa Miyamoto, Kamakura Kanagawa (JP); Reiko Yoshimura, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 424 days.

(21) Appl. No.: 18/175,017

(22) Filed: Feb. 27, 2023

(65) Prior Publication Data

US 2024/0118244 A1 Apr. 11, 2024

(30) Foreign Application Priority Data

Sep. 16, 2022 (JP) ................................. 2022-148154

(51) Int. Cl.
  *G01N 29/00* (2006.01)
  *G01N 29/036* (2006.01)
  *G01N 29/24* (2006.01)

(52) U.S. Cl.
  CPC ....... *G01N 29/036* (2013.01); *G01N 29/2443* (2013.01); *G01N 2291/014* (2013.01); *G01N 2291/021* (2013.01)

(58) Field of Classification Search
  CPC ............. G01N 29/036; G01N 29/2443; G01N 2291/014; G01N 2291/021
  See application file for complete search history.

(56) References Cited

U.S. PATENT DOCUMENTS

2012/0305467 A1* 12/2012 Giebelhausen ........ B01J 20/226
  502/402
2014/0212944 A1 7/2014 Tian et al.
  (Continued)

FOREIGN PATENT DOCUMENTS

CN   111867318 A   10/2020
CN   112742351 A    5/2021
  (Continued)

OTHER PUBLICATIONS

Suttipong Wannapaiboon et al., "Hierarchical structuring of metal-organic framework thin-films on quartz crystal microbalance (QCM) substrates for selective adsorption applications," J. Mater. Chem. A, DOI: 10.1039/c5ta05620a (2015).
  (Continued)

*Primary Examiner* — Francis C Gray
(74) *Attorney, Agent, or Firm* — Finnegan, Henderson, Farabow, Garrett & Dunner, LLP

(57) ABSTRACT

A molecular sensor of an embodiment includes a sensitive film including a plurality of metal organic framework particles, and a detector configured to be capable of measuring a change in physical quantity due to adsorption of a target molecule to the sensitive film. Pores are present between the plurality of metal organic framework particles, and the pores are any of mesopores of 2 nm or more and 50 nm or less, micropores smaller than the mesopores, and macropores larger than the mesopores. A sum of areas of the micropores is defined as $S_{mi}$, a sum of areas of the mesopores is defined as $S_{me}$, a sum of areas of the macropores is defined as $S_{ma}$, and an area of an entire image analysis area is defined as $S_{total}$, in an image analysis area by two-dimensional image analysis on a cross section of the sensitive film in a thickness direction. Pore distribution satisfies $0.35 \leq S_{me}/(S_{mi}+S_{me}+S_{ma})$, $0.01 \leq S_{mi}+S_{me}+S_{ma})/S_{total} \leq 0.5$.

20 Claims, 8 Drawing Sheets

(56) References Cited

U.S. PATENT DOCUMENTS

| | | |
|---|---|---|
| 2018/0215628 A1 | 8/2018 | Lee et al. |
| 2018/0266977 A1 | 9/2018 | Hashizume |
| 2018/0318789 A1* | 11/2018 | Stabler ................ B01J 20/2803 |
| 2019/0169036 A1 | 6/2019 | Minguez et al. |
| 2020/0191687 A1 | 6/2020 | Shinjo et al. |
| 2021/0293756 A1 | 9/2021 | Shinjo et al. |
| 2022/0274040 A1* | 9/2022 | Chen ................ B01J 20/28069 |
| 2022/0336200 A1* | 10/2022 | McHugh ................ H01J 49/16 |
| 2022/0370984 A1* | 11/2022 | Weston ................ B01J 20/226 |
| 2022/0379261 A1 | 12/2022 | Wang et al. |
| 2023/0168166 A1 | 6/2023 | Kaneto et al. |

FOREIGN PATENT DOCUMENTS

| | | |
|---|---|---|
| JP | 2015-105275 A | 6/2015 |
| JP | 2019-124700 A | 7/2019 |
| JP | 2019-532018 A | 11/2019 |
| JP | 2020-98113 A | 6/2020 |
| JP | 2022-7969 A | 1/2022 |
| JP | 2022-27167 A | 2/2022 |

OTHER PUBLICATIONS

Lars Heinke et al., "The surface barrier phenomenon at the loading of metal-organic frameworks," Nature Communications, vol. 5, No. 4562, 6 pages (2014).

William Morris et al., "Role of Modulators in Controlling the Colloidal Stability and Polydispersity of the Ui0-66 Metal-Organic Framework," ACS Appl. Mater. Interfaces, vol. 9, pp. 33413-33418 (2017).

Shengran Cai et al., "In situ construction of metal-organic framework (MOF) Ui0-66 film on Parylene-patterned resonant microcantilever for trace organophosphorus molecules detection," Analyst, vol. 144, pp. 3729-3735 (2019).

Erika Virmani et al., "On-Surface Synthesis of Highly Oriented Thin Metal-Organic Framework Films through Vapor-Assisted Conversion," J. Am. Chem. Soc., vol. 140, pp. 4812-4819 (2018).

* cited by examiner

MOLECULAR SENSOR, MOLECULAR DETECTION DEVICE, AND MOLECULAR DETECTION METHOD

CROSS-REFERENCE TO RELATED APPLICATIONS

This application is based upon and claims the benefit of priority from Japanese Patent Application No. 2022-148154 filed on Sep. 16, 2022, and the entire contents of which are incorporated herein by reference.

FIELD

Embodiments described herein relate generally to a molecular sensor, a molecular detection device, and a molecular detection method.

BACKGROUND

Sensing technology using an odor (gas) sensor can digitize odors in the air.

This technology is widely used for odor determination, measurement of volatile organic compounds (VOC) in the atmosphere, confirmation of performance of air purifiers, detection of troubles in devices, etc.

In recent years, there has been an increasing interest in applications of detection of explosives, detection of narcotics and stimulants, which have hitherto relied on the sense of smell of dogs, diagnosis of specific diseases by exhalation, etc.

Thus, high performance of the odor (gas) sensor is desired.

As conventional gas sensing devices, hydrogen flame ionization detector (FID), photo-ionization detector (PID), and infrared gas analyzer (Non-Dispersive Infra-Red: NDIR) are exemplified. In these devices, improvements in portability (miniaturization and weight reduction), safety, life of light source, price, and recognition of substances, etc., are required. Particularly, miniaturization is being developed because it is advantageous for incorporation into industrial robots and use at a work site. A semiconductor gas sensor, which is a representative of small sensors, measures gas concentration by utilizing changes in electrical properties such as electric resistance generated when oxygen adsorbed on a metal oxide is consumed by a reducing substance. In recent years, many kinds of metal oxides such as $SnO_2$, $ZnO_2$, $In_2O_3$, $WO_3$ and $V_2O_3$ have come to be used. In addition, studies have been conducted to achieve high sensitivity and improve selectivity by, for example, doping Pd, Pt, Au, Ag, etc., into these metal oxides. However, the sensitivity and selectivity are not yet sufficient.

On the other hand, from the viewpoint of further improving the sensitivity, selectivity, simplicity, quickness, reliability, stability, etc., of the odor (gas) sensor, mass detection sensors using a quartz crystal microbalance (QCM), surface acoustic wave (SAW), a micro cantilever (MCL), etc., have been drawing attention in recent years. For example, in the case of QCM, a sensor has been proposed in which a sensitive film that adsorbs a target molecule such as an organic polymer is formed on a device surface. When the target molecule is adsorbed on the sensitive film, the mass of the film increases, and the resonance frequency of a crystal oscillator changes. Since a frequency change amount is proportional to a mass of an adsorbed analyte molecule, the concentration of the analyte molecule can be measured.

A metal organic framework is called MOF, which stands for Metal Organic Framework, and is a new porous material that has been actively studied in recent years. This material is a structure including metal ions and organic ligands connecting the metal ions and having a large number of nanometer-sized pores. It is characterized by a large specific surface area of up to 10,000 $m^2/g$ and heat resistance exceeding 300° C., and it is expected to be applied to various fields such as gas storage, separation, purification, catalysts, batteries, and sensors.

Conventionally, in the case of introducing a MOF film as a sensitive film for a sensor, for example, in the case of a QCM sensor, a drop casting method has been used in which MOF particles having a particle size of submicron order are synthesized in advance, and dispersed in a solvent and cast. However, since the particle size of the MOF is large, the cast film is non-uniform and low in density, and since the particle size is large, the cohesive force between the particles cannot be sufficiently obtained, so that there have been problems that the MOF film becomes brittle and peels off, and the like. Therefore, a sensor has been reported in which a dense thin film having high crystallinity and high orientation is formed using a layer-by-layer method (LBL method: a method of growing a film while stacking the film for each layer) or the like. However, the MOF species to which this method can be applied is limited. In addition, in the case of a single crystalline thin film, a path through which the target molecule is adsorbed is only pores present on the outermost surface, and there has been a problem that the sensitivity extremely decreases when the pores on the outermost surface are blocked by water molecules or the like.

Literature 1: Suttipong Wannapaiboon et al, J. Mater. Chem. A, 2015, 3, 23385-23394

Literature 2: Lars Heinke et al, Nature Communications volume 5, Article number:4562 (2014)

Literature 3: William Morris et al, ACS Appl. Mater. Interfaces 2017, 9, 33413-33418

DETAILED DESCRIPTION

Hereinafter, embodiments will be described with reference to the accompanying drawings. In each embodiment, substantially the same constituent parts are denoted by the same reference signs and an explanation thereof will be partly omitted in some cases. The drawings are schematic, and a relation of thickness and planer dimension of each part, a thickness ratio among parts, and so on are sometimes different from actual ones.

In the following description, the "target molecule" refers to a molecule that can be detected by a molecular sensor according to a first embodiment. The "target molecule" does not necessarily refer to one type of molecule, and may refer to a mixture of a plurality of types of molecules. The mixture of a plurality of types of molecules may be, for example, a group of molecules that constitute one type of odor as a whole.

First Embodiment

A molecular sensor according to a first embodiment is a molecular sensor including: a sensitive film including a plurality of metal organic framework particles; and a detector configured to be capable of measuring a change in physical quantity due to adsorption of a target molecule to the sensitive film, in which pores are present between the plurality of metal organic framework particles, the pores are any of mesopores of 2 nm or more and 50 nm or less, micropores smaller than the mesopores, and macropores larger than the mesopores, and when a sum of areas of the micropores present in an image analysis area by two-dimensional image analysis on a cross section of the sensitive film in a thickness direction is defined as $S_{mi}$, a sum of areas of the mesopores is defined as $S_{me}$, a sum of areas of the macropores is defined as $S_{ma}$, and an area of an entire image analysis area is defined as $S_{total}$, pore distribution by the two-dimensional image analysis satisfies $0.35 \leq S_{me}/(S_{mi}+S_{me}+S_{ma})$, $0.01 \leq (S_{mi}+S_{me}+S_{ma})/S_{total} \leq 0.5$.

Figure 1:
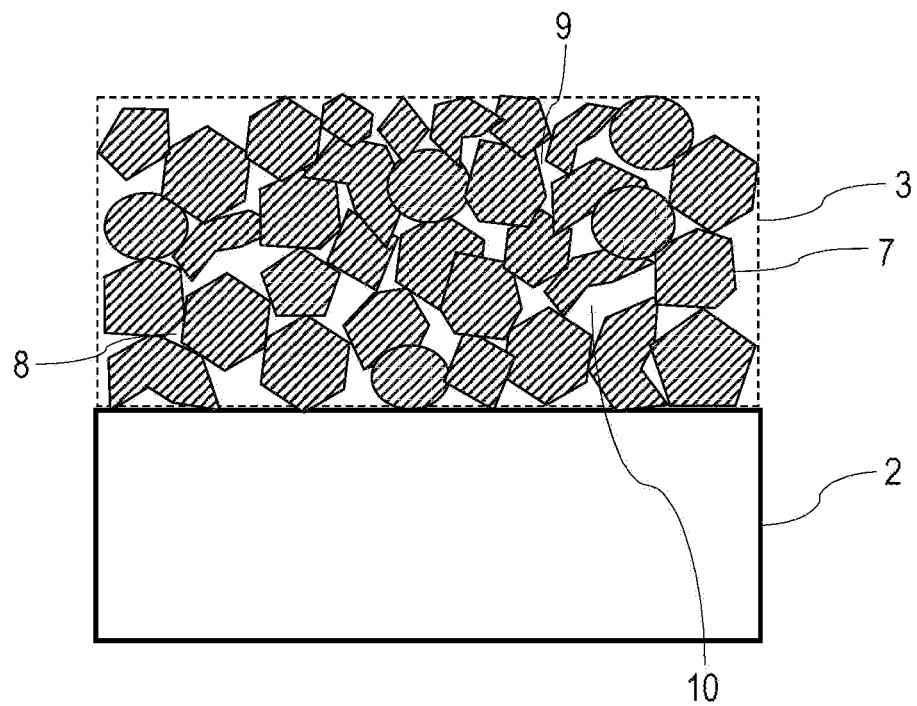
FIG. 1 is a schematic cross-sectional view schematically showing a plurality of pores formed by a plurality of MOF particles included in a sensitive film included in a molecular sensor according to a first embodiment.

FIG. 1 is a schematic cross-sectional view schematically showing a plurality of pores formed by MOF particles 7 included in a sensitive film included in a molecular sensor according to the present embodiment. In FIG. 1, a sensitive film 3 exists on a QCM detector unit 2. The sensitive film 3 has a plurality of MOF particles 7 having micropores. A pore is present, for example, between the two or more MOF particles 7. Specifically, for example, the pore is present between the two MOF particles 7 by combining the unevenness of the two MOF particles 7. Alternatively, a pore is present at an interface where the sensitive film 3 is formed, for example, between the QCM detector 2 in FIG. 1 and the two MOF particles 7. In addition, the same applies to a pore present between the three or more MOF particles 7, and the pore may be present from the three or more MOF particles 7 and between the three or more MOF particles 7 and the QCM detector 2. The pore may also be present by one MOF particle 7. As the pore present by one MOF particle 7, for example, the pore may be present at an interface between the MOF particle 7 and the QCM detection unit 2 due to the unevenness of the MOF particle 7. Also, when the MOF particle 7 is coated with a resin or the like, a pore may be present between the resin and the unevenness of the MOF particle 7. As described above, the pores are present in the entire sensitive film. Therefore, a plurality of pores are present in the sensitive film 3. A plurality of pores present by the MOF particles are present in the sensitive film. The size of one pore is any of less than 2 nm, 2 nm or more and 50 nm or less, and larger than 50 nm. A pore having a pore size of less than 2 nm are referred to as a micropore 8, a pore having a pore size of 2 nm or more and 50 nm or less is referred to as a mesopore 9, and a pore having a pore size larger than 50 nm is referred to as a macropore 10. Since the sensitive film includes a plurality of pores, a plurality of types of pores can be present in the sensitive film. Under two inequalities $0.35 \leq S_{me}/(S_{mi}+S_{me}+S_{ma})$ and $0.01 \leq (S_{mi}+S_{me}+S_{ma})/S_{total} \leq 0.5$ of pore distribution by two-dimensional image analysis to be described next, the sensitive film can include all pore types of micropores, mesopores, and macropores. Also, the sensitive film may include mesopores and micropores, or may include two types of mesopores and macropores, or only mesopores. The presence of the micropores 8, mesopores 9, and macropores 10 between the MOF particles 7 forms a sensitive film.

The sensitive film included in the molecular sensor according to the present embodiment includes a plurality of MOF particles, a pore is present between the MOF particles, and the pore is any of macropore, mesopore, and micropore. In addition, as described above, an expression including a sum of areas of macropores, mesopores, and micropores present in the image analysis area by two-dimensional image analysis in the cross section of the sensitive film in the thickness direction satisfies $0.35 \leq S_{me}/(S_{mi}+S_{me}+S_{ma})$ and $0.01 \leq (S_{mi}+S_{me}+S_{ma})/S_{total} \leq 0.5$.

When the sum of areas of mesopores ($S_{me}$) is 0.35 or more and 1 or less with respect to the sum of areas of the plurality of pores ($S_{mi}+S_{me}+S_{ma}$), transport and diffusion of the target molecule into the film are promoted as compared with a single crystalline thin film, and sensitivity and response speed of the sensor can be improved.

Further, as a result of intensive studies, it has been found that when the sum of areas of the plurality of pores ($S_{mi}+S_{me}+S_{ma}$) is 0.01 or more and 0.5 or less with respect to the area of the entire image analysis area ($S_{total}$), the sensitivity and response speed as a molecular sensor can be improved. When the sum of areas of the plurality of pores ($S_{mi}+S_{me}+S_{ma}$) is less than 0.01 with respect to the area of the entire image analysis area ($S_{total}$), it means that the ratio of the pores formed by the plurality of MOF particles is small with respect to the cross-sectional area of the sensitive film, and the transport and diffusion of the target molecule into the sensitive film described above become insufficient, and the sensitivity and response speed of the sensor decrease.

On the other hand, when the sum of areas of the plurality of pores ($S_{mi}+S_{me}+S_{ma}$) exceeds 0.5 with respect to the area of the entire image analysis area ($S_{total}$), this means that the ratio of the pores formed by the plurality of MOF particles is large with respect to the cross-sectional area of the sensitive film, and thus the substantial amount of MOF per unit volume of the sensitive film is reduced. Therefore, the target molecule cannot be sufficiently adsorbed, and the sensitivity as a sensor decreases. Preferably, the sum of areas of the plurality of pores ($S_{mi}+S_{me}+S_{ma}$) is 0.05 or more and 0.3 or less with respect to the area of the entire image analysis area ($S_{total}$).

When the range of $S_{me}/(S_{mi}+S_{me}+S_{ma})$ is not considered in each of the ranges of $S_{me}/(S_{mi}+S_{me}+S_{ma})$ and $(S_{mi}+S_{me}+S_{ma})/S_{total}$ described above, the transport and diffusion of the target molecule into the sensitive film as described above are not sufficiently promoted even if the other range is satisfied, and the sensitivity and response speed of the sensor cannot be improved.

On the other hand, when the range of $(S_{mi}+S_{me}+S_{ma})/S_{total}$ is not considered, the value may be less than 0.01 or may exceed 0.5 depending on the magnitude of the values of $S_{mi}$ and $S_{ma}$ even if the other range is satisfied. Therefore, as described above, when the value is less than 0.01, the transport and diffusion of the target molecule into the sensitive film become insufficient, and the sensitivity and response speed of the sensor decrease, and when the value exceeds 0.5, the target molecule cannot be sufficiently adsorbed, and the sensitivity as the sensor decreases.

The pore distribution by two-dimensional image analysis described above preferably further satisfies $S_{ma}/(S_{mi}+S_{me}+S_{ma})$ 0.65. More preferably, the pore distribution satisfies $0 \leq S_{ma}/(S_{mi}+S_{me}+S_{ma}) \leq 0.65$. This is because physical strength of the sensitive film is maintained and stability of the film can also be maintained when the sum of areas of the macropores ($S_{ma}$) is 0 or more and 0.65 or less with respect to the sum of areas of the plurality of pores.

In general, in the case of a homogeneous and random structure having isotropy in three dimensions, the area ratios of pores obtained from a two-dimensional image of a cross section, that is, $S_{me}/(S_{mi}+S_{me}+S_{ma})$, $(S_{mi}+S_{me}+S_{ma})/S_{total}$, and $S_{ma}/(S_{mi}+S_{me}+S_{ma})$, are equal to the volume ratios (Delesse principle), and thus the area ratio can be read as the volume ratio.

Therefore, the sensitive film included in the molecular sensor according to the present embodiment also has pores in the depth direction similarly to the cross section observed. Since the distribution of pores in the depth direction is the same as the distribution of pores at the time of cross-section observation, the strength and reactivity as a sensitive film do not change.

As described above, when the pore distribution by two-dimensional image analysis described above satisfies 0.35 $S_{me}/(S_{mi}+S_{me}+S_{ma})$ and $0.01 \leq (S_{mi}+S_{me}+S_{ma})/S_{total} \leq 0.5$, the sensitivity and response speed of the sensor can be improved. In addition, when the pore distribution by two-dimensional image analysis satisfies $S_{ma}/(S_{mi}+S_{me}+S_{ma})$ 0.65, the stability of the sensitive film can be maintained.

The definitions of the pore of MOF particles and the pore formed by MOF particles in the present embodiment are the same as those defined by the International Union of Pure and Applied Chemistry (IUPAC), and it is defined that the micropore has a pore size of less than 2 nm, the mesopore has a pore size of 2 nm or more and 50 nm or less, and the macropore has a pore size of larger than 50 nm. The sensitive film has micropores included in the MOF, and the size of the micropores varies depending on the type of the MOF and an organic ligand, but is often 1 nm or less. A molecule larger than the micropore of the MOF is not adsorbed in the micropore, but a molecule smaller than the micropore of the MOF is adsorbed in the micropore. Therefore, MOF with different pore sizes can be used according to the size of the target molecule.

A method for measuring the pore described above will be described later.

The sensitive film preferably includes only MOF particles, but may include MOF particles and a gas-permeable substance.

The particle size of the MOF is preferably 5 nm or more and 100 nm or less. When the particle size is smaller than 5 nm, properties as a three-dimensional structure are weakened, and physical and chemical stability is deteriorated, so that deterioration or decomposition is likely to occur. When the particle size is larger than 100 nm, it is difficult to form mesopores between particles, and formation of macropores having a pore size larger than 50 nm becomes dominant. The cohesive force between the particles is also reduced, and the film tends to be fragile. Therefore, the particle size is further preferably 10 nm or more and 50 nm or less. A method for measuring the particle size of the MOF particles will be described later.

The thickness of the sensitive film is preferably 10 nm or more and 10 µm or less. When the film thickness is less than 10 nm, at least the primary particle size of the MOF is limited to less than 10 nm. As described above, since the particle size of the MOF is preferably 5 nm or more and 100 nm or less, when the film thickness is less than 10 nm, the MOF contained in the sensitive film is almost a single layer of primary particles. Therefore, when compared with the same area of the sensitive film, the absolute amount of MOF contained in the sensitive film is reduced. This also reduces the amount of target molecules that can be adsorbed, leading to a decrease in sensitivity. In addition, in order to maintain the sensitivity of the sensitive film having a thickness of less than 10 nm, it is necessary to increase the film-forming area of the sensitive film 3 in order to increase the absolute amount of MOF, which leads to an increase in size of the device. On the other hand, when the thickness of the sensitive film exceeds 10 µm, not only the incidence of cracks and the like due to internal stress of the film increases, but also, for example, when combined with QCM, MCL, or the like, oscillation resistance increases, and there is a possibility that oscillation cannot be performed. Even if the oscillation can be performed, the sensitivity decreases. The thickness of the sensitive film is preferably 50 nm or more and 5 µm or less. Within this range, the absolute amount of MOF can be increased, the amount of target molecules that can be adsorbed can also be increased, and the sensitivity can be improved.

The thickness of the sensitive film described above can be measured, for example, as follows.

<Method for Measuring Thickness of Sensitive Film>

Selection of cut portion in entire sensitive film First, a site where the sensitive film of the molecular sensor is formed is taken out, and the film is confirmed at a low magnification such that the entire sensitive film enters the field of view, and cut in a thickness direction of the sensitive film at a position where cracks, defects, ridges, foreign matters, and the like are not clearly and specifically present. Next, the sensitive film is subjected to focused ion beam (FIB) processing, and the cut cross section is observed. Here, as a FIB apparatus, for example, SMI3300SE manufactured by Hitachi, Ltd. or Strata 400s manufactured by FEI can be used. Observation of the entire film and observation of the cross section can be performed using, for example, a scanning transmission electron microscope (STEM), a transmission electron microscope (TEM), or a scanning electron microscope (SEM).

Observation of Cross Section of Sensitive Film

The cross section in the thickness direction of the sensitive film is obtained by the FIB processing, and then a mapping image of an element (Zr, O, C, etc.) derived from a component of the MOF in the entire cross section is captured by energy dispersive X-ray spectroscopy (EDX). This makes it possible to confirm whether or not a substance having a composition different from that of the MOF is contained in the cross section. When the element derived from a component of the MOF is used for a substance having a composition different from that of the MOF, the cross section can be observed using a method capable of distinguishing between the MOF and the substance having a composition different from that of the MOF. At the time of observing the cross section of the sensitive film described above, there are the following cases: when a substance other than MOF is partially present, when two or more layers of a layer of MOF and a layer of a substance other than MOF are present, and when the substance other than MOF is molecularly mixed with the MOF. Here, the phrase "a substance other than MOF is partially present" means that a substance having a size 10 times or more the size of MOF particles is present in the film. Hereinafter, what kind of operation is performed on each of the above-described cases at the time of observing the cross section of the sensitive film to select a portion for measuring the thickness of the sensitive film will be described.

Selection of Cross Section in which Thickness of Sensitive Film is Measured

When a substance other than MOF is partially present or when two or more layers of a layer of MOF and a layer of a substance other than MOF are present at the time of the above-described cross-section observation, this cross section is not adopted.

On the other hand, when a substance other than MOF is molecularly mixed with the MOF, when the substance other than MOF is uniformly mixed with a size equivalent to that of the MOF particle, or when the substance other than MOF doesn't exist, this cross section is adopted.

Until the cross section that can be adopted as described above is obtained, the selection of the cut portion in the entire sensitive film described above, observation of the cross section of the sensitive film, and the selection of the cross section in which the thickness of the sensitive film is measured, are performed.

The cross sections at three or more different positions in the sensitive film are selected by the selection of the cut portion in the entire sensitive film, the observation of the cross section of the sensitive film, and the selection of the cross section for measuring the thickness of the sensitive film described above.

Measurement of Thickness of Sensitive Film

After selecting the cross section for measuring the thickness of the sensitive film, the film thickness of the sensitive film is measured by the above-described STEM or the like. At this time, when selecting an observation site, the cross section is observed at a magnification at which the entire region where the sensitive film is formed falls within the field of view as much as possible, and a site having the largest thickness is selected. However, when observing the entire film, a position where cracks, defects, ridges, foreign matters, and the like are clearly and specifically present is not selected. Furthermore, the magnification is increased within a range where the film thickness of the selected site falls within the field of view, and observation is performed.

The thickness of the sensitive film is measured by the method described in the measurement of the thickness of the sensitive film in each of the selected three or more cross sections. The measured thickness of the sensitive film can be calculated by averaging the thickness of the sensitive film in each cross section thus obtained.

<Method for Measuring Particle Size of MOF Particles>

Also for evaluation of the particle size, methods by STEM, TEM, and SEM image observation can be used as in the measurement of the thickness of the sensitive film. There are a method of extracting a contour of a particle by image analysis software such as ImageJ, and a method of extracting a contour of a particle by human judgment while viewing an image. In addition to image observation by STEM or the like, the size and shape of particles can be determined by using EDX together with a mapping image regarding an element (Zr, O, C, etc.) derived from a component of the MOF in the same cross section captured when measuring the thickness of the sensitive film. In the case of a crystalline substance such as MOF, the particle size can also be estimated from a pattern obtained from X-ray diffraction (XRD) by using the Debye-Scherrer method in which the half width of the diffraction main peak and the crystal particle size are in an inversely proportional relationship.

Specifically, the crystal particle size D (Å) has the following relationship. $D=K\lambda/(\beta \cos \theta)$. Here, K is a constant, and although depending on a shape factor, generally 0.9, $\beta$ is a half width (rad) of a diffraction peak, $\lambda$ is a wavelength of an X-ray, for example, 1.5406 (Å) in the case of a CuKα1 ray, and $\theta$ is a Bragg angle (rad).

<Method for Measuring Pores Present Between Plurality of MOF Particles>

Figure 2A:
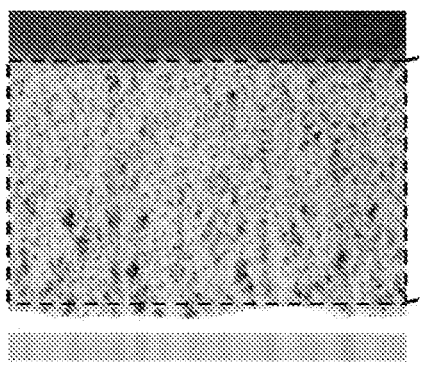
FIGS. 2A to 2C are views showing an example of a method for acquiring pore distribution by image analysis.
Figure 2B:
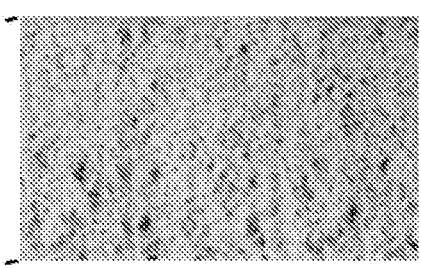
Figure 2C:
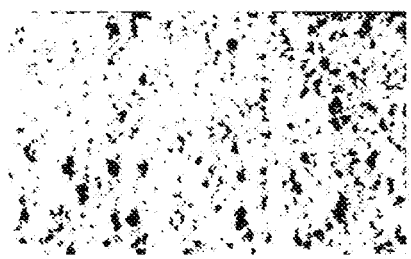

Pore distribution can be evaluated, for example, by binarizing the cross-sectional image used in the film thickness analysis using image processing software such as ImageJ. FIG. 2 is an actual image of Example 1, in which a range avoiding an uneven portion in the vicinity of a substrate and an uneven portion on the outermost surface is cut out (FIG. 2B) from the cross-sectional image as shown in FIG. 2A, and binarization processing using ImageJ is performed to obtain FIG. 2C. At this time, the size of the cut image is set to an area corresponding to the square of the thickness of the sensitive film at the minimum. The pore area obtained from this image can be converted into an equivalent circle diameter to obtain pore distribution.

Here, the mapping image is imaged by EDX in the same range as the range in which binarization processing is performed by ImageJ to confirm whether the binarization processing by ImageJ is correctly performed. The image obtained by binarizing the above-described cross-sectional image is collated with the EDX mapping image, and when the distribution of MOF particles and pores greatly deviates, the cross-sectional image is not adopted. In that case, a cross section at another position of the sensitive film is obtained based on the method for measuring the thickness of the sensitive film described above, and then imaging is performed on the cross section to evaluate the film thickness again. Next, the particle size of the MOF particles is evaluated again based on the method for measuring the particle size of the MOF particles. Thereafter, the cross-sectional image used in the measurement of the thickness of the sensitive film and the measurement of the particle size of the MOF particles is cut under the condition of the above-described cutting range. Then, binarization processing is performed on the cut out image, and the binarized image and the mapping image by EDX are collated again. The cross section to be used in the measurement of the pores present between the plurality of MOF particles is selected until it can be confirmed that the binarization processing is correctly performed by the collation of the two images.

By selecting the cross section described above in the cross-sectional images at three or more different positions and averaging the pore distribution in each image, the pores present between the plurality of MOF particles can be calculated.

Here, the MOF for forming the sensitive film will be specifically described. The MOF preferably contains Zr, and is more preferably contains Zr as a main component. This is because the Zr-based MOF has generally high heat resistance and water resistance. That the main component of the MOF is Zr, that is, 50% or more of the MOF is Zr means that the concentration of Zr is 50% or more in the metal element concentration detectable by the EDX described above.

In particular, it is preferable to use a MOF having a structure in which dicarboxylic acids are coordinated to a hexanuclear $Zr_6O_4(OH)_4$ cluster (described below). For example, a typical structure is shown below.

[Chemical Formula 1]

In the above structure, o (white circle) indicates a $Zr_6O_4(OH)_4$ cluster, and a solid line indicates a dicarboxylic acid ligand.

In the case of defect free crystal, the hexanuclear $Zr_6O_4(OH)_4$ cluster can be a structure in which 12 dicarboxylic acids coordinate to a hexanuclear $Zr_6O_4(OH)_4$ cluster.

The MOF having such a structure is at least one of UIO-66, UIO-67, UIO-68 and derivatives thereof. UIO-66, UIO-67, and UIO-68 have structures in which dicarboxylic acid ligands are 1,4-benzenedicarboxylic acid, 4,4'-biphenyldicarboxylic acid, and 4,4''-terphenyldicarboxylic acid, respectively.

The derivative is a derivative in which a new functional group is introduced into a benzene ring of the ligand contained in these MOFs. The functional group is, for example, an alkyl group, an amino group, a hydroxy group, an alkoxy group, an amide group, a nitro group, a sulfo group, an aldehyde group, an acyl group, an ester group, or a carbonyl group such as a carboxyl group, a halogeno group such as fluorine, chlorine, bromine, or iodine, or the like. The derivative is a derivative in which the benzene ring of the ligand is substituted with a heteroaromatic ring such as a pyridine ring or an imidazole ring.

UIO-67 includes one substituted by a heterocyclic compound such as 9-fluorenone-2,7-dicarboxylic acid, fluorene-2,7-dicarboxylic acid, or carbazole-2,7-dicarboxylic acid, instead of 4,4'-biphenyldicarboxylic acid.

These MOFs not only have high heat resistance and high water resistance, but also relatively easy to synthesize and have a wide selection of film forming methods from fine crystals to thin films, and are easily applicable to the sensitive film. Besides, MOF-801, MOF-808, NU-100S, CAU-24 or the like can be used as MOF containing Zr as a main component. In addition to Zr-based MOF, MOF such as MIL-53, MIL-101, MOF-74, or ZIF-8 can be used.

Next, a molecular sensor according to a first embodiment using the sensitive film described above will be described.

The molecular sensor of the first embodiment can have a measurement mechanism using QCM as a detection unit. An example of the molecular sensor according to the first embodiment will be described with reference to parts 3A and 3B of FIG. 3.

Figure 3A:
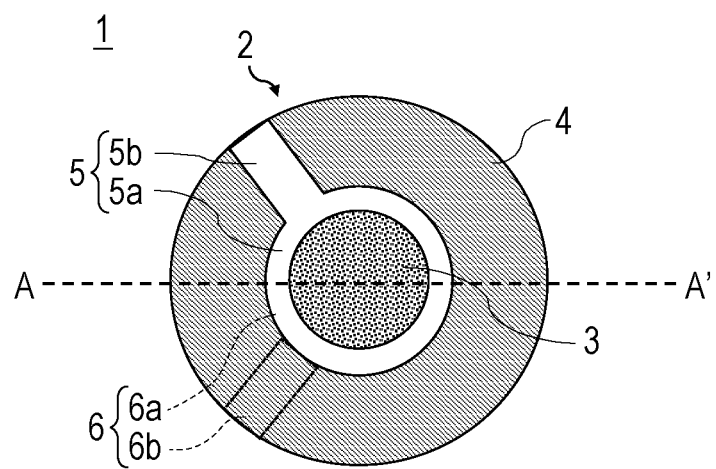
FIGS. 3A and 3B are diagrams showing an example of a molecular sensor of the first embodiment.
Figure 3B:
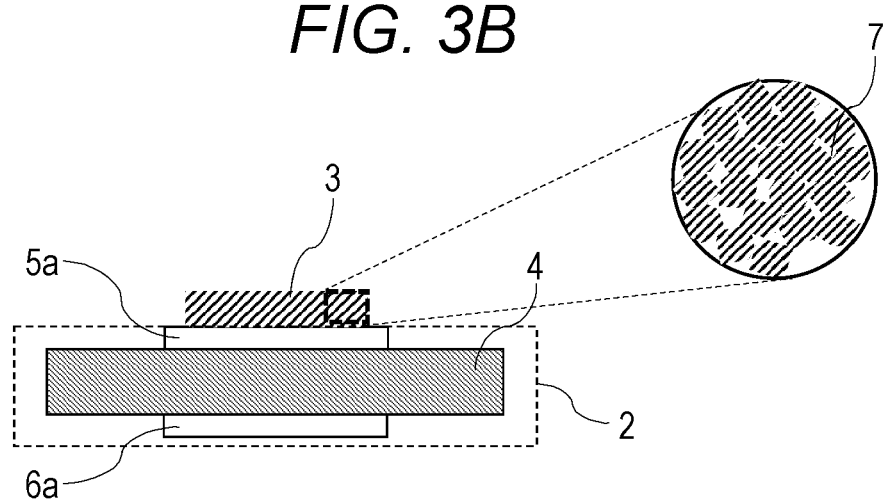

FIG. 3 shows an example of a molecular sensor 1 according to the first embodiment. FIG. 3A shows a plan view of the molecular sensor 1. FIG. 3B is a cross-sectional view taken along A-A' of FIG. 3A. FIG. 3B also shows an enlarged view of a part (a portion surrounded by a broken line) of the sensitive films 3.

The molecular sensor 1 includes a QCM detection unit 2 (QCM detector) and a sensitive film 3 provided on a surface of the QCM detection unit 2. The QCM detection unit 2 includes a disk-shaped quartz substrate 4, with two thin film electrodes, that is, an upper electrode 5 and a lower electrode 6, which are arranged with the quartz substrate 4 interposed between the electrodes.

As described above, the sensitive film 3 includes a plurality of MOF particles 7 including micropores, micropores, mesopores, and macropores are formed between the plurality of MOF particles 7, pore distribution calculated from an equivalent circle diameter by two-dimensional image analysis for the micropores ($S_{mi}$), mesopores ($S_{me}$), and macropores ($S_{ma}$) satisfies $0.35 \leq S_{me}/(S_{mi}+S_{me}+S_{ma})$, $0.65 \geq S_{ma}/(S_{mi}+S_{me}+S_{ma})$, $0.01 \leq (S_{mi}+S_{me}+S_{ma})/S_{total} \leq 0.5$, and $S_{ma}$ represents an area of macropores larger than 50 nm, $S_{me}$ represents an area of mesopores of 2 nm or more and 50 nm or less, $S_{mi}$ represents an area of micropores less than 2 nm, and $S_{total}$ represents an area of the entire image analysis area, respectively.

The sensitive film 3 covers at least a part of an upper excitation portion 5a, and is provided such that the upper excitation portion 5a exists between the sensitive film 3 and the quartz substrate 4. In addition to the above, the sensitive film 3 covers at least a part of a lower excitation portion 6a, and may be provided such that the lower excitation portion 6a exists between the sensitive film 3 and the quartz substrate 4.

With regard to the size of the sensitive film 3, for example, it is preferable that the sensitive film 3 be formed in a disk shape that is concentric with the upper excitation portion 5a and has a diameter smaller than the upper excitation portion 5a when viewed in plan. Although not limited, the diameter of the sensitive film 3 is preferably set to be, for example, 20% to 90% of the area of the quartz substrate 4.

The upper electrode 5 includes, for example, as shown in FIG. 3, an upper excitation portion 5a, which is concentric with the quartz substrate 4 and has a diameter smaller than that of the quartz substrate 4, and an upper lead portion 5b extending from a portion of a peripheral edge of the upper excitation portion 5a to a peripheral edge of the quartz substrate 4.

Similarly to the upper electrode 5, the lower electrode 6 includes a lower excitation portion 6a, which is concentric and has a diameter smaller than that of the quartz substrate 4, and a lower lead portion 6b extending from a portion of a peripheral edge of the lower excitation portion 6a to a peripheral edge of the quartz substrate 4.

The upper electrode 5 and the lower electrode 6 are preferably Pt, Au, Ag, Cu, Mo, Ni, Ti, W, Al, indium tin oxide (ITO), AZO, or the like, for example. A film in which a 200 nm Au layer is stacked on a 10 nm Ti layer is typically used. In order to ensure adhesion to a sensitive film such as MOF, a 10 nm Ti layer and a 100 nm $SiO_2$ layer may be further stacked on the surface layer of the Au electrode as a base layer. The sizes of the upper electrode 5 and the lower electrode 6 are not limited to those described above, and also regarding the shape, the upper electrode 5 and the lower electrode 6 do not have to have the shape shown in FIG. 3 as long as the quartz substrate 4 can be excited.

The quartz substrate 4 is preferably AT-cut, for example. The quartz substrate 4 does not have to have a disk shape as shown in FIG. 3, and may have a polygonal shape or the like.

The size of the QCM detection unit 2 is not limited and may be the same as that of a general QCM element. For example, the diameter of the quartz substrate 4 is preferably about 2 mm to 10 mm.

The molecular sensor 1 may further include an AC power source (not shown) for applying a voltage between the upper electrode 5 and the lower electrode 6 by a lead wire or the like, and a frequency measuring device (not shown) that detects a frequency of the quartz substrate 4. The molecular sensor 1 may include a temperature adjustment device that heats the sensitive film 3. By heating the sensitive film 3 at a temperature at which the structure of sensitive film 3 is not denatured, adsorbed target molecules can be removed. As a result, the sensitivity is prevented from being lowered by the remaining target molecules, and it becomes possible to perform molecular detection with high sensitivity again.

The detection unit of the molecular sensor according to the first embodiment can include any one of measurement mechanisms using a quartz crystal microbalance, a micro cantilever, or surface acoustic wave. Since the molecular sensor including QCM in the detection unit has been described above, a molecular sensor having a measurement mechanism using MCL and SAW as the detection unit will be described.

Figure 4A:
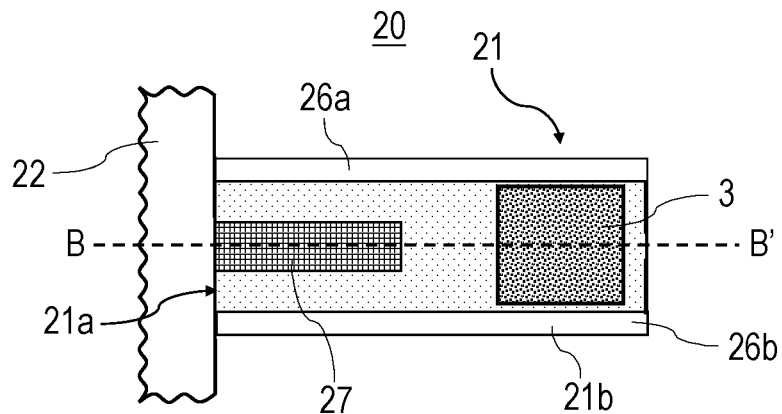
FIGS. 4A and 4B are diagrams showing another example of the molecular sensor of the first embodiment.
Figure 4B:
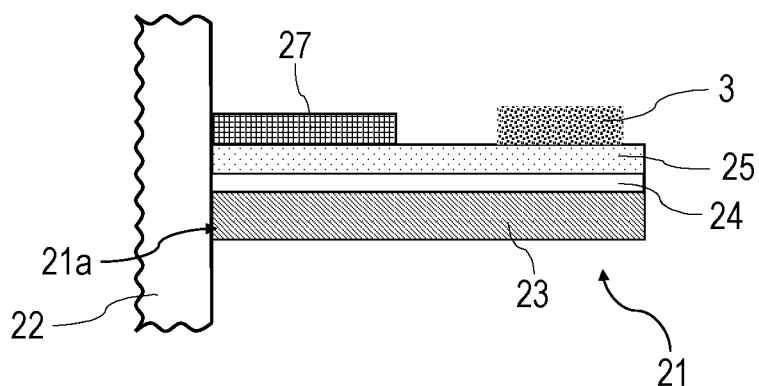

FIG. 4 shows a molecular sensor 20 including an MCL detection unit 21 (MCL detector). FIG. 4A is a plan view of the molecular sensor 20 as viewed from above, and FIG. 4B is a cross-sectional view taken along B-B' of the molecular sensor 20. The molecular sensor 20 in this example includes an MCL detection unit 21 and a sensitive film 3 provided on a surface of the MCL detection unit 21. The MCL detection unit 21 has an elongated rectangular shape in a plan view, and has a fixed end 21a fixed to a support 22 and a free end 21b that is not fixed. That is, the MCL detection unit 21 has a cantilever shape. The MCL detection unit 21 has a layered structure and includes a substrate 23 as the lowermost layer. A lower electrode 24 is stacked on the substrate 23. A piezoelectric body 25 is stacked on the lower electrode 24. An elongated first upper electrode 26a and a second upper electrode 26b are stacked along two long sides of the piezoelectric body 25. A detection electrode 27 is stacked on the piezoelectric body 25 located on the fixed end 21a side between the first upper electrode 26a and the second upper electrode 26b.

The sensitive film 3 is preferably fixed to a portion of an uppermost surface of the MCL detection unit 21 near the free end 21b. For example, the sensitive film 3 is fixed onto the piezoelectric body 25 between the first upper electrode 26a and the second upper electrode 26b. A conductive film such as an Au thin film, an insulating film such as $SiO_2$, a metal oxide film such as of $Al_2O_3$ or $TiO_2$, a silane coupling agent, a self-assembled monolayer film, or the like (not shown) may be interposed between the piezoelectric body 25 and the sensitive film 3.

The first upper electrode 26a, the second upper electrode 26b, and the lower electrode 24 are connected to an AC power source or the like, and apply an AC voltage to the piezoelectric body 25. Since the piezoelectric body 25 is deformed by voltage application, the piezoelectric body 25 expands and contracts due to the AC voltage and vibrates at a predetermined resonance frequency. The detection electrode 27 detects the frequency of the piezoelectric body 25.

The substrate 23 is formed using, for example, silicon, glass, resin, or the like.

The upper electrode 26, the lower electrode 24, and the detection electrode 27 are formed using, for example, a metal material such as Pt, Au, Mo, W, or Al.

The piezoelectric body 25 is formed by using, for example, lead zirconate titanate (PZT), lead zinc niobate-lead titanate solid solution (PZN-PT), lead manganese niobate-lead titanate zirconate solid solution (PMnN-PZT), aluminum nitride (AlN), zinc oxide (ZnO), potassium sodium niobate (KNN), lithium niobate ($LiNbO_3$), or the like.

The size of the MCL detection unit 21 is not limited and may be the same as that of a general MCL element. For example, the size of the sensitive film 3 in a plan view can be set to be 20% to 90% of the area of the MCL 21. As described above, the thickness of the cross section is preferably 10 nm or more and 10 µm or less, and further preferably 50 nm or more and 5 µm or less.

The molecular sensor 20 as described above can also be used in the same detection method as in the first embodiment. In the molecular sensor 2S, when the target molecule is adsorbed to the sensitive film 3, the energy loss corresponding to the mass of the target molecule occurs, so that the resonance frequency of the piezoelectric body 25 changes. The target molecule can be detected by measuring the change with the detection electrode 27.

Although the example of using the QCM detection unit 2 and the MCL detection unit 21 has been described above, the detection unit is not limited to these, and another measurement mechanism may be used. The detection unit is preferably a mechanism capable of measuring a mass change of the sensitive film 3, for example.

As the detection unit, SAW or the like can be further used. A SAW detection unit includes, for example, two sets of interdigitated electrodes (IDEs) arranged on a piezoelectric substrate surface at desired intervals. The sensitive film 3 can be disposed, for example, between two sets of electrodes on the piezoelectric substrate. When the target molecule is adsorbed to the sensitive film 3, the propagation velocity and amplitude of a surface acoustic wave propagating on the piezoelectric substrate surface change, and the target molecule can be detected by detecting the change with the two electrodes.

Alternatively, a detection unit including a mechanism capable of measuring changes in the electric resistance, impedance, electric conductivity, etc., of the sensitive film 3 may be used. Such a detection unit uses, for example, a field effect transistor (FET), an IDE type sensor (interdigitated electrode: IDE), or the like. For example, when the FET is used, the sensitive film 3 can be disposed as a channel that connects between a source electrode and a drain electrode, for example. When the IDE type sensor is used, the sensitive film 3 can be provided between or on the electrodes of the IDE, for example.

Next, a molecular detection method for detecting a target molecule in a sample using the molecular sensor according to the present embodiment will be described. Here, the detecting may be detecting the type and/or amount of the target molecule, for example.

Such a molecular detection method is a molecular detection method including: bringing a target molecule into contact with a sensitive film containing a plurality of metal organic framework particles; measuring a change in physical quantity of the sensitive film due to adsorption of the target molecule to the sensitive film; and determining a type or amount of the target molecule from a result of the measurement, in which pores are present between the plurality of metal organic framework particles, the pores are any of mesopores of 2 nm or more and 50 nm or less, micropores smaller than the mesopores, and macropores larger than the mesopores, and when a sum of areas of the micropores present in an image analysis area by two-dimensional image analysis on a cross section of the sensitive film in a thickness direction is defined as $S_{mi}$, a sum of areas of the mesopores is defined as $S_{me}$, a sum of areas of the macropores is defined as $S_{ma}$, and an area of an entire image analysis area is defined as $S_{total}$, pore distribution by the two-dimensional image analysis satisfies $0.35 < S_{me}/(S_{mi}+S_{me}+S_{ma})$, $0.01 \leq S_{mi}+S_{me}+S_{ma})/S_{total} \leq 0.5$. The pore distribution by the two-dimensional image analysis described above further satisfies $S_{ma}/(S_{mi}+S_{me}+S_{ma}) \leq 0.65$.

The sample is, for example, a solid or liquid capable of generating the target molecule. The solid or liquid sample may be one that generates the target molecule at room temperature and atmospheric pressure. Alternatively, the sample may generate the target molecule, for example, when the atmosphere or a carrier gas such as $N_2$ or argon is flown, or when the sample is heated. The type of sample is not limited, and examples thereof include medicines, foods and drinks, drinking water, organisms, fragrances, cargo or luggage, household products, electric appliances, and the like. Alternatively, the sample may be a gas. The gas sample is, for example, air, exhaled air (breath), exhaust gas, gas fuel, or the like.

The target molecule is, for example, a chemical substance in a gas state. For example, target molecules may be, but are not limited to, VOC, oxygen, hydrogen, carbon dioxide, carbon monoxide, nitrogen, noble gases, hydrogen sulfide, ammonia, nitrogen oxides, acetylene, ethylene, methane, ethane, propane, and the like. The target molecule may be, for example, a chemical substance generated from or contained in a narcotic/stimulant, a gunpowder, an explosive, a chemical weapon, a fresh food, or a specific animal, plant or the like. Alternatively, 2-methylisoborneol, geosmin, or the like, which causes a musty odor, may be used.

As described above, the target molecule is not necessarily one type of molecule, and may include a plurality of types of molecules. The plurality of types of molecules may be, for example, a group of molecules that form an odor.

Figure 5:
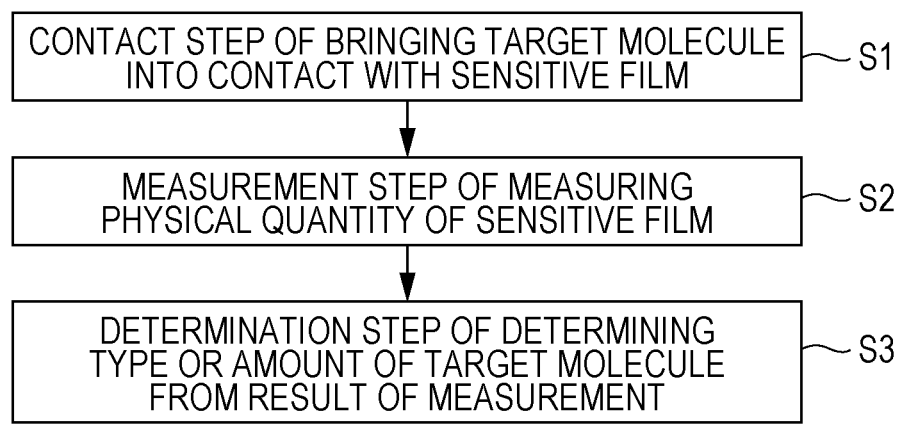
FIG. 5 is a flowchart showing an example of a molecular detection method of the first embodiment.

As shown in FIG. 5, the detection method according to the embodiment includes, for example, the following steps: (S1) a contact step of bringing the target molecule into contact with the sensitive film, (S2) a measurement step of measuring a change in the physical quantity of the sensitive film due to the adsorption of the target molecule to the sensitive film, and (S3) a determination step of determining the type or amount of the target molecule from the result of the measurement.

Hereinafter, an example of a procedure of the molecular detection method will be described. First, the molecular sensor 1 is prepared. Next, the target molecule is brought into contact with the sensitive film 3 by, for example, placing the molecular sensor 1 in an environment where the sample exists, bringing the sample close to the molecular sensor 1, or blowing or suctioning the sample to bring the target molecule into contact with the sensitive film 3 (contact step S1).

The contact step S1 allows the target molecule to be adsorbed to the sensitive film 3. When the target molecule is a molecule easily adsorbed to the sensitive film 3, the target molecule can enter from the surface of the sensitive film 3 and permeate into the pore provided on the depth side.

Next, the physical quantity of the sensitive film 3 is measured using the QCM detection unit 2 (measurement step S2). For example, the measurement may be performed over time from before the contact step S1, and measurement data when a change amount of a measurement value is maximum or when the change amount of the measurement value becomes a constant value (saturation value) may be used. A rate of change of the measurement value over a certain period of time may be used. Alternatively, the measurement does not have to be performed over time, and in that case, the measurement may be performed at least two time points before and after the contact step S1.

According to a further embodiment, the measurement may not be performed before the contact step S1. In that case, as the measurement value before the contact step S1, a physical quantity measurement value obtained when the target molecule is not adsorbed to the sensitive film 3 obtained in the past may be used. Alternatively, as the measurement value before the contact step S1, a measurement value of a gas that does not contain the target molecule in a detectable amount, for example, the atmosphere may be used.

In the QCM detection unit 2, the mass of the sensitive film 3 can be measured by converting an oscillation frequency of the quartz substrate 4 into an electrical signal and detecting the electrical signal. After the contact step S1, the oscillation frequency of the quartz substrate 4 changes due to energy loss corresponding to the mass of the target molecule adsorbed to the sensitive film 3, and an electrical signal measurement value that changes accordingly is obtained.

Next, the type or amount of the target molecule is determined using the measurement result obtained in the measurement step S2 (determination step S3). First, the change amount of the measurement value before and after the contact step S1 is calculated. For example, the change amount is calculated by subtracting the measurement value before the contact step S1 from the measurement value after the contact step S1. The change amount may be used in the next step in the form of the change amount of the electrical signal, or may be used by being converted into a change amount of the physical quantity. Next, the type or amount of the target molecule is determined from the change amount.

For example, before carrying out the present detection method, for a plurality of types of the sensitive films 3, by measuring the change in the physical quantity in advance for each of a plurality of types of known standard target molecules, the type of the target molecule that can be detected for each type of the sensitive films 3 can be associated.

Therefore, when there is a change in the physical quantity in the sample using the specific sensitive film 3, by comparing with the above association, the target molecule contained in the sample can be determined to be one of the standard target molecules that can be detected by the sensitive film 3. If no change in physical quantity is observed in the sample, the detection is repeated again using another sensitive film 3 to find the sensitive film 3 in which the physical quantity has changed, whereby the types of target molecules can be narrowed down. This process can be performed at once by using a multi molecular sensor including a plurality of molecular sensors described later.

The molecular sensor 1 can also determine the amount and concentration of the target molecule. For example, using the sensitive film 3 associated with a specific standard target molecule, a calibration curve of the change amount of the physical quantity of the sensitive film 3 is created with a plurality of concentrations of the standard target molecule. By comparing the change amount in the sample with this calibration curve, the concentration of the target molecule can be determined.

In a further embodiment, the molecular detection method may further include a heating removal step of removing the target molecule from the sensitive film 3 by heating the sensitive film 3 after the measurement step S2. For example, the heating is preferably performed at 80° C. to 200° C. for about 10 seconds to 600 seconds. By performing heating under this condition, the target molecule that has entered the inside of the sensitive film 3 can be easily released. Since the MOF particles contained in the molecular sensor according to the present embodiment have an excellent heat resistance of, for example, 200° C. or higher, almost all the target molecules can be removed without denaturing the structure of the sensitive film 3 even under such heating conditions. As a result, the sensitivity is prevented from being lowered by the remaining target molecules, and it becomes possible to perform detection with high sensitivity again. For this reason, the molecular sensor 1 of the embodiment can be reused by a simple operation of heating and is economical.

According to a further embodiment, there is provided a multi molecular sensor including a plurality of molecular sensors of different types. Here, "different types" means that crystal structures themselves of the MOF particles of the sensitive film 3 may be different, or even the crystal structures are the same, combinations of types and/or amount ratios of metal ions and organic ligands connecting the metal ions may be different from each other. In addition, even if the crystal structure, metal ion species, and ligand are all the same, the particle sizes may be different, or even if the particle sizes are the same, the pore distribution of micropores, mesopores, and macropores formed between the MOF particles may be different. The term "different from each other" does not necessarily mean that all molecular sensors are different, and encompasses a case where molecular sensors are partially the same.

Figure 6:
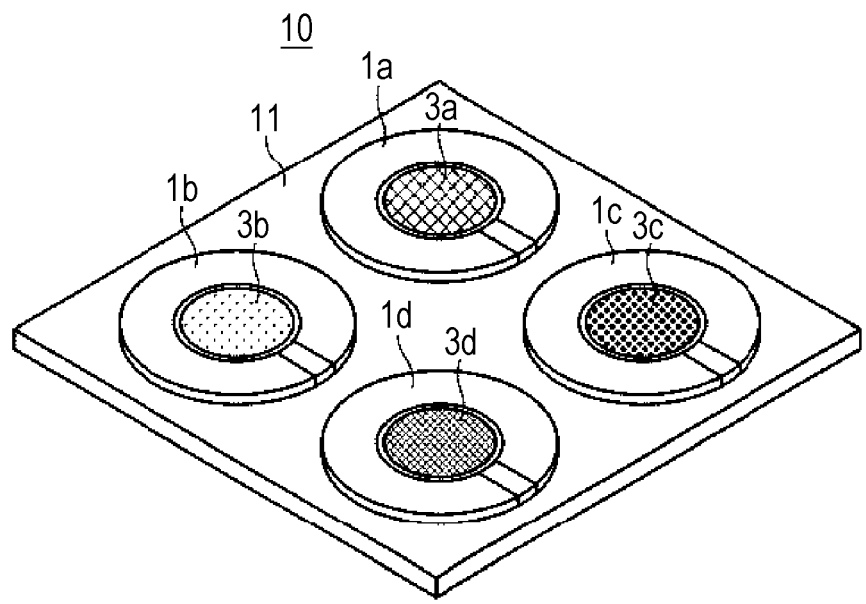
FIG. 6 is a diagram showing an example of a multi molecular sensor of the first embodiment.

FIG. 6 shows a multi molecular sensor 10. The multi molecular sensor 10 includes four types of molecular sensors 1a to 1d arranged in an array on a substrate 11. The molecular sensors 1a to 1d have the same configuration as that of the molecular sensor 1 described above, and include sensitive films 3a to 3d of different types, respectively. Other configurations may be the same as each other.

In the multi molecular sensor 1S, changes in the physical quantities of the sensitive films 3a to 3d can be individually measured. For example, each of the molecular sensors 1a to 1d may individually include a frequency measuring device (not shown), or for the molecular sensors 1a to 1d, a frequency measuring device may perform measurement sequentially one by one.

In the molecular detection method using the multi-molecular sensor 10, the contact step and the measurement step are performed using a plurality of sensitive films in which combinations of types and/or amount ratios of metal ions of the metal organic framework particles and organic ligands connecting the metal ions to the metal organic framework particles are different from each other, and the determination step determines the type and/or amount of the target molecule by combining change amounts of the physical quantities of the sensitive films and recognizing the combined change amounts as a pattern. For example, one type of sample is brought into contact with the molecular sensors 1a to 1d at once to perform measurement. As a result, four change amounts (data a to d) corresponding to the molecular sensors 1a to 1d are obtained. When the plurality of the data a to d are combined and recognized as a pattern, the pattern may differ depending on the type of target molecule. For example, change amount patterns are recorded in advance for a plurality of types of standard target molecules, the pattern in the sample is compared with the change amount patterns, and if there are standard target molecules with similar patterns, it can be determined that the same type of target molecule exists in the sample.

Figure 7:
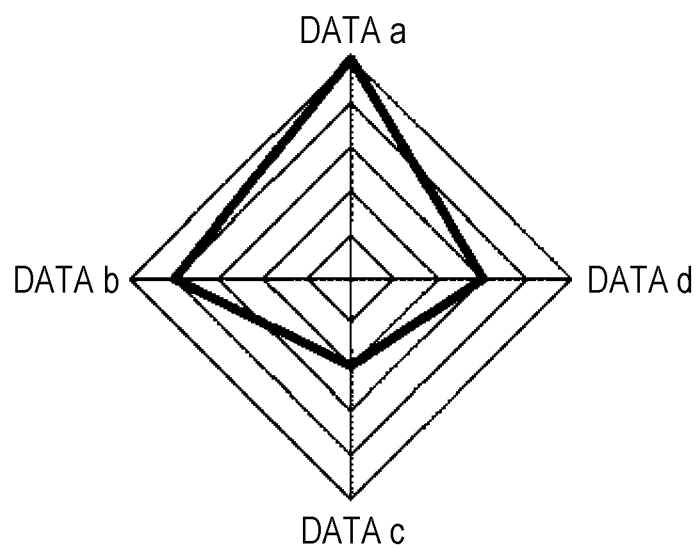
FIG. 7 is a diagram showing an example of a radar chart obtained by the multi molecular sensor of the first embodiment.

The pattern may be, for example, a ratio of the four change amounts. Alternatively, for example, by representing the data a to d on a radar chart as shown in FIG. 7, the pattern is obtained as a polygon having a specific shape. Since this shape may differ depending on the type of the target molecule, the type of the target molecule can be easily specified by performing comparison as described above based on the shape.

The amount of the target molecule can be determined by the size of the entire pattern. For example, when the polygonal shape of the radar chart is similar to a standard target molecule and the size of the polygon is larger than the standard target molecule, it can be seen that although the target molecule contained in the sample is of the same type as the standard target molecule, the amount is larger than the amount of the standard target molecule.

The number of molecular sensors included in the multi molecular sensor is not limited to four, and two, three, or four or more molecular sensors may be arranged. Preferably, three or more molecular sensors are arranged. The larger the number of molecular sensors, the more accurately a target molecule having a similar chemical structure can be detected. The olfactory sense (sense of smell) of an organism can be reproduced by arranging the same number as the types of olfactory receptors of the organism. A plurality of the molecular sensors are not necessarily arranged in an array, and may be arranged, for example, in a straight line, in a circle, or at random positions.

According to a further embodiment, the type of sample containing a plurality of types of target molecules can be identified or distinguished by application of pattern recognition as described above and analysis using machine learning or the like. For example, for a single odor containing a plurality of chemical substances, such as a rose scent and a wine scent, each pattern can be obtained by the multi molecular sensor. By comparing with patterns of a plurality of known standard samples, the type and amount can be detected from the pattern obtained from the sample. Even in the same wine scent, for example, it is also possible to identify or distinguish complexes that have slight differences in composition such as different brands.

As described above, the molecular sensor according to the present embodiment is a molecular sensor including: a sensitive film including a plurality of metal organic framework particles; and a detector configured to be capable of measuring a change in physical quantity due to adsorption of a target molecule to the sensitive film, in which pores are present between the plurality of metal organic framework particles, the pores are any of mesopores of 2 nm or more and 50 nm or less, micropores smaller than the mesopores, and macropores larger than the mesopores, and when a sum of areas of the micropores present in an image analysis area by two-dimensional image analysis on a cross section of the sensitive film in a thickness direction is defined as $S_{mi}$, a sum of areas of the mesopores is defined as $S_{me}$, a sum of areas of the macropores is defined as $S_{ma}$, and an area of an entire image analysis area is defined as $S_{total}$, pore distribution by the two-dimensional image analysis satisfies $0.35 \leq S_{me}/(S_{mi}+S_{me}+S_{ma})$, $0.01 \leq S_{mi}+S_{me}+S_{ma})/S_{total} \leq 0.5$. As a result, the molecular sensor can be improved in sensitivity and selectivity, and can be easily reused.

Second Embodiment

Figure 8:
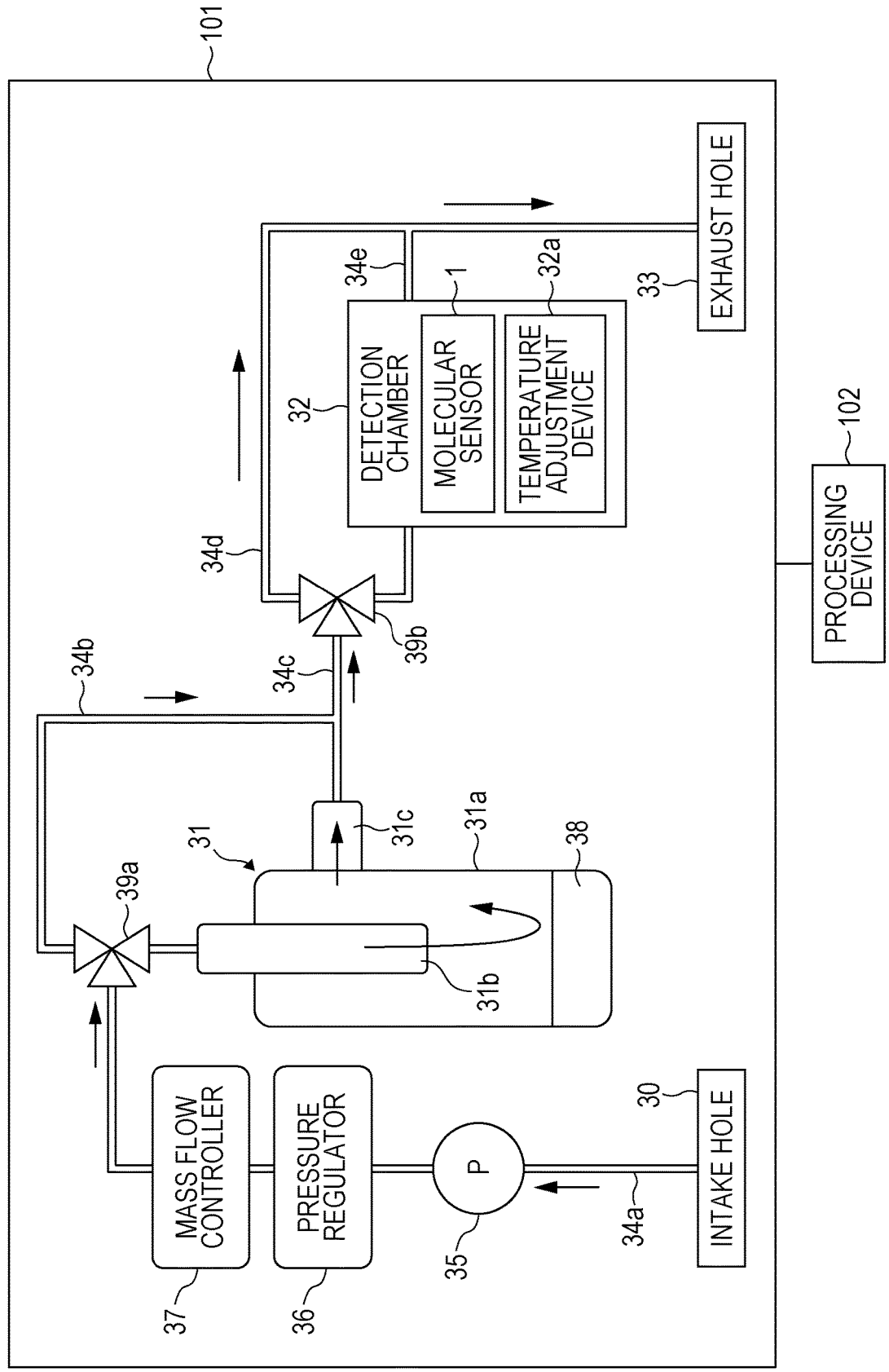
FIG. 8 is a block diagram showing an example of a molecular detection device according to a third embodiment.

According to a second embodiment, there is provided a molecular detection device that includes any one of the molecular sensors described above and detects a target molecule. As shown in FIG. 8, a molecular detection device 100 includes a detection unit 101, including a molecular sensor 1, and a processing device 102.

The detection unit 101 (detector or detection apparatus) includes an intake hole 3S, a gas generator 31, a detection chamber 32, and an exhaust hole 33. These members are connected by, for example, a flow path. The arrows in the figure represent a direction of gas flow.

A filter (not shown) may be provided between the intake hole 30 and a pump 35. The intake hole 30 and the gas generator 31 are connected by, for example, a flow path 34a. For example, a pump 35, a pressure regulator 36, and a mass flow controller 37 are interposed in the flow path 34a in this order from the intake hole 30 side toward the gas generator 31.

The gas generator 31 includes, for example, a container 31a for containing a sample 38, a gas introduction pipe 31b for introducing the atmosphere sucked from the intake hole 30 into the container 31a, a gas lead-through pipe 31c for allowing gas to flow out of the container 31a, and a sample feed inlet (not shown). The gas introduction pipe 31b is disposed so as to face the sample 38 contained in a bottom of the container 31a, for example. The gas lead-through pipe 31c is connected to the detection chamber 32 by a flow path 34c in which a three-way valve 39b is interposed.

A three-way valve 39a is interposed between the mass flow controller 37 and the gas introduction pipe 31b of the gas generator 31. One valve of the three-way valve 39a is connected to the gas introduction pipe 31b, and the other valve is connected via a flow path 34b to the flow path 34c connecting the gas lead-through pipe 31c and the three-way valve 39b. Immediately before the flow path 34b is connected to the flow path 34c, a valve for preventing backflow to the gas generator 31 may be separately provided.

A flow path 34d is connected to the third valve of the three-way valve 39b. The other end of the flow path 34d is directly connected to the exhaust hole 33. The three-way valve 39b is switched to send gas to the detection chamber 32 when measurement is performed, is switched to send the gas to the flow path 34d when measurement is not performed, and discharges the gas from the exhaust hole 33.

The detection chamber 32 contains the molecular sensor 1. The molecular sensor 1 analyzes the target molecule contained in the gas sent from the gas generator 31. The detection chamber 32 may include a temperature adjustment device 32a for heating and cooling the sensitive film 3 of the molecular sensor 1. The detection chamber 32 may further include a power source (not shown) that applies a voltage to the detector of the molecular sensor 1.

The detection chamber 32 is connected to the exhaust hole 33 by a flow path 34e, so that the analyzed gas is discharged through the flow path 34e.

For example, the detection unit 101 may further include the pump 35, the pressure regulator 36, the mass flow controller 37, the three-way valve 39a, the three-way valve 39b, the temperature adjustment device 32a, and a driver 46 (see FIG. 9) that drives a power supply according to a command of a CPU 40 described later.

The detection chamber 32 may be formed, for example, in the shape of a cassette and attached to the detection unit 101 so as to be able to be taken in and out. In that case, the molecular sensor 1 can be replaced according to the type of the target molecule to be detected.

Alternatively, even if the detection chamber 32 is fixed to the detection unit 101, there is no problem. The molecular sensor 1 disposed in the detection chamber 32 may be the molecular sensor of any of the above embodiments. A plurality of sets of molecular sensor may be set, or a multi molecular sensor may be used.

Figure 9:
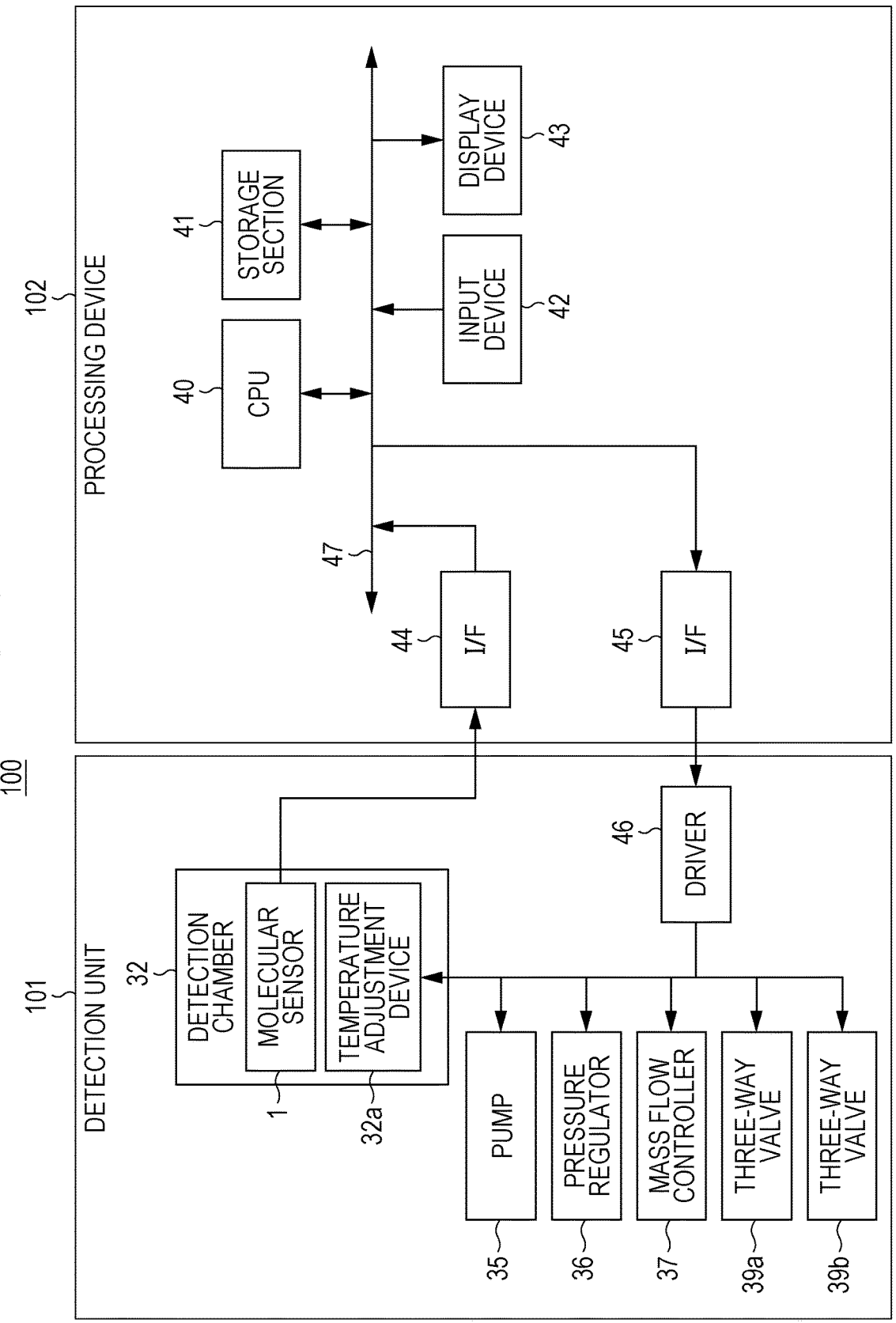
FIG. 9 is a block diagram showing an example of a detection unit and a processing device included in the molecular detection device according to the third embodiment.

As shown in FIG. 9, the processing device 102 includes, for example, the CPU 4S, a storage section 41 (memory), an input device 42, and a display device 43. The processing device 102 may further include an interface (I/F) 44 that outputs a measurement value as an electrical signal from the molecular sensor 1 to the storage section 41, and an I/F 45 that outputs a drive signal to the driver 46.

When the processing device 102 includes a plurality of molecular sensors as described in the first embodiment, the type and/or amount of the target molecule is determined by combining a plurality of change amounts of the physical quantities obtained from the plurality of molecular sensors and recognizing the combined change amounts as a pattern.

The CPU 40 controls each part of the detection unit 101 and the processing device 102 and calculates measurement values according to a program.

The storage section 41 stores a program executed by the CPU 4S, information on a measurement value output from the molecular sensor 1, and an arithmetic expression and a calibration curve used for calculating the measurement value, and/or a measurement value or a pattern of a standard target molecule. The storage section 41 includes a non-volatile memory such as a flash memory, and a volatile memory such as a RAM.

The input device 42 includes a keyboard, a mouse, switches, buttons, etc., for inputting various information to the processing device 102.

The display device 43 includes a display or the like that displays a calculation result or the like as a chart or text. Instead of providing the input device 42 and the display device 43 separately, a touch panel having a display function and an input function may be provided.

Each part in the processing device 102 is connected by, for example, a system bus 47.

The molecular detection device 100 may not include the gas generator 31. In that case, measurement can be performed by bringing the intake hole 30 close to the sample 38, further blowing and suctioning, and placing the molecular detection device 100 in a space where the sample 38 exists.

The molecular sensor 1 can be manufactured as a chip of the order of about 1 mm. The molecular detection device 100 can be a portable device of the order of about several tens of cm.

Figure 10:
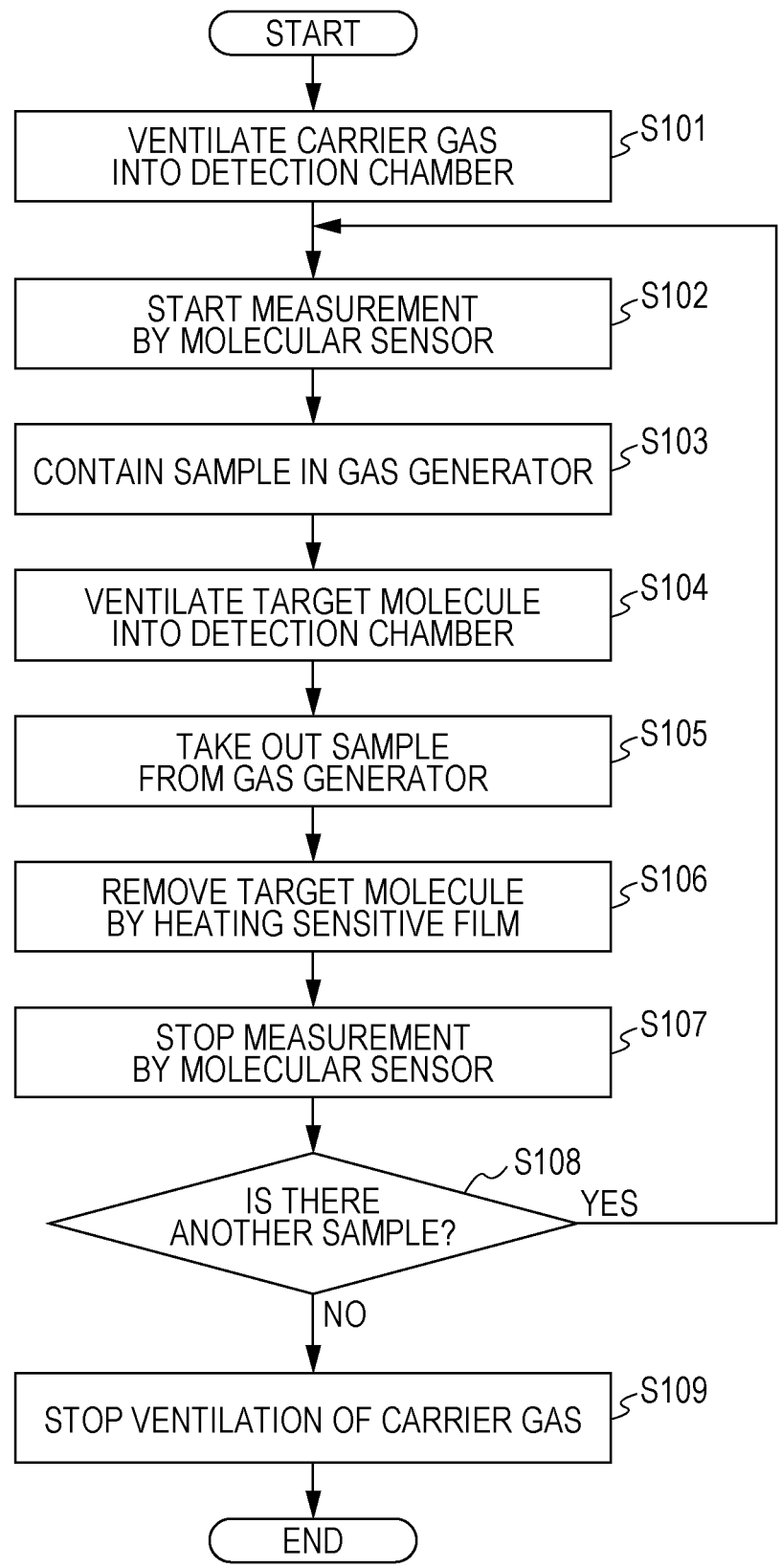
FIG. 10 is a flowchart showing an example of a molecular detection device according to the third embodiment.

A method of operating the molecular detection device 100 will be described with reference to FIG. 10.

First, a carrier gas is ventilated into the detection chamber 32 (S101). The carrier gas is, for example, an atmosphere, but may be another gas. As the carrier gas, for example, $N_2$ or argon gas connected to a cylinder or the like may be used. When a cylinder is used, the cylinder is connected directly to the pressure regulator 36 without using a pump.

For example, according to a command from the CPU 4S, the three-way valve 39a is switched to the gas generator 31 side, and the three-way valve 39b is switched to the detection chamber 32 side, and the pump 35 is driven through the driver 46. By driving the pump 35, the carrier gas is sent from the intake hole 30 to the detection chamber 32 through the flow path 34a, the gas generator 31, and the flow path 34c. The mass flow controller 37 controls a flow rate of the carrier gas. By this operation, the gas previously contained in the detection chamber 32 is discharged from the exhaust hole 33 to the outside.

Next, the molecular sensor 1 starts measurement (S102). In the measurement, if the molecular sensor 1 is a sensor using QCM, a voltage is applied between the upper electrode 5 and the lower electrode 6, and the oscillation frequency of the quartz substrate 4 is measured by a frequency measuring device. The obtained electrical signal (measurement value of carrier gas) is sent to the storage section 41 at a constant sampling rate and stored in the storage section 41.

Next, the sample 38 is contained in the container 31a through the sample feed inlet (not shown) of the container 31a of the gas generator 31 (S103). The carrier gas is released from the gas introduction pipe 31b of the gas generator 31 toward the sample 38 in the container 31a, and is discharged from the gas lead-through pipe 31c to the flow path 34c. At that time, a target molecule generated from the sample 38 is also mixed and then discharged together with the carrier gas from the gas lead-through pipe 31c. The carrier gas containing the target molecule, which has flowed into the flow path 34c, is ventilated into the detection chamber 32 (S104).

In the molecular sensor 1, the oscillation frequency of the quartz substrate 4 changes due to the adsorption of the target molecule on the sensitive film 3. Then, the carrier gas containing the target molecule is discharged from the exhaust hole 33 through the flow path 34e. If the sample 38 does not make it into the container 31a, the three-way valve 39a may be switched to allow the carrier gas to flow into the flow path 34b, and then the intake hole 30 may be brought close to the sample 38 for suction.

Next, the sample 38 is taken out from the gas generator 31 (S105). As a result, the carrier gas containing no target molecule is ventilated into the detection chamber 32. If the target molecule remains in the container 31a, the three-way valve 39a may be switched to the flow path 34b side to promptly ventilate the carrier gas into the detection chamber 32.

Next, the sensitive film 3 is heated by driving the temperature adjustment device 32a according to the command of the CPU 40 (S106). As a result, the target molecule is removed from the sensitive film 3. Subsequently, the sensitive film 3 is cooled to the original temperature by the temperature adjustment device 32a. The target molecule can also be removed from the sensitive film 3 only by ventilation of the carrier gas without performing the heating in step S106. Then, the carrier gas containing the target molecule is discharged from the exhaust hole 33 through the flow path 34e. Then, the measurement by the molecular sensor is stopped (S107).

After that, when there is another sample to be measured (S108, Yes), the process may return to step S102 to perform the measurement again. When there is no sample to be measured anymore and the measurement ends (S108, No), the drive of the pump 35 is stopped, and the ventilation of the carrier gas is stopped (S109).

Figure 11:
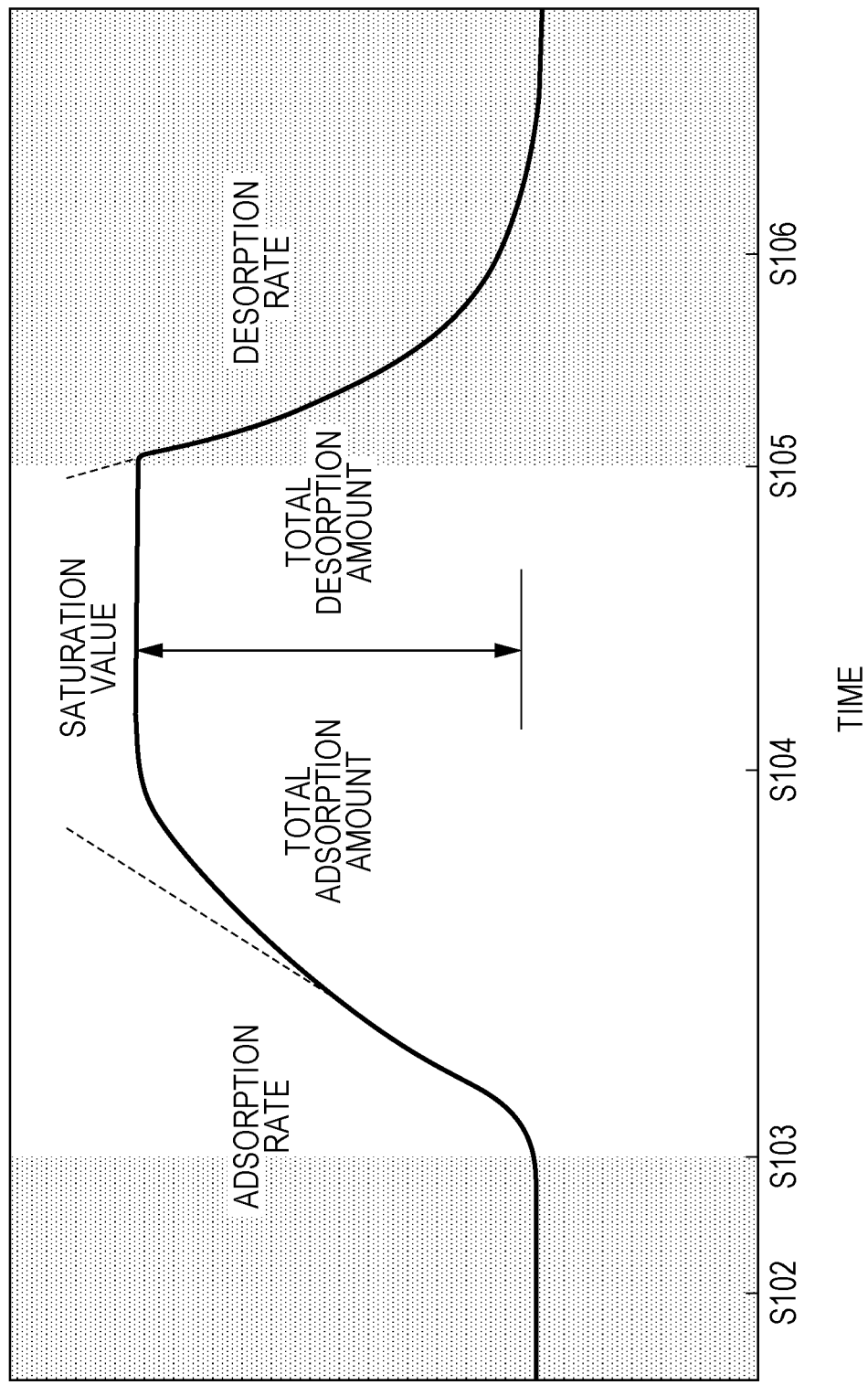
FIG. 11 is a graph showing an oscillation frequency change amount detected by the molecular detection device according to the third embodiment.

On the other hand, after the measurement is completed in step S107, the CPU 40 retrieves the stored measurement value and arithmetic expression from the storage section 41 and calculates a change amount of the measurement value. For example, the data to be analyzed may be, as shown in FIG. 11, an oscillation frequency change amount that can be obtained by subtracting the measurement value (baseline) of the carrier gas obtained in step S102 from a maximum value or saturation value of the measurement value obtained in step S104. This means a total adsorption amount of the target molecule on the molecular sensor 1. Alternatively, the data to be analyzed may be a rising slope of the oscillation frequency obtained in step S104. This means an adsorption rate of the target molecule to the molecular sensor 1. Alternatively, the data to be analyzed may be a falling slope of the oscillation frequency in step S106. This means a desorption rate of the target molecule from the molecular sensor 1. Alternatively, the data to be analyzed may be the oscillation frequency change amount that can be obtained by subtracting the measurement value (baseline) obtained at the end of step S106 from the maximum value or the saturation value obtained in step S104. This means a total desorption amount of the target molecule from the molecular sensor 1. These change amounts are output from the CPU 40 to the storage section 41 and stored in the storage section 41. When the detection chamber 32 includes a plurality of molecular sensors, the CPU 40 further calculates a pattern of a change amount for each of the molecular sensors, and outputs the pattern to the storage section 41 for storage. The plurality of molecular sensors include at least a sensor in which combinations of types and/or amount ratios of metal ions of metal organic framework particles of the sensitive films and organic ligands connecting the metal ions are different from each other.

Subsequently, the CPU 40 retrieves the change amount and the arithmetic expression, if necessary, the calibration curve, the measurement value or the pattern of the standard target molecule, etc., from the storage section 41, and determines the type and/or amount of the target molecule. The determination result is output from the CPU 40 to the storage section 41 and stored in the storage section 41. The determination result may be output to the display device 43.

When a plurality of samples are measured, the respective results are sequentially output for the samples.

The data processing, calculation and analysis as described above do not necessarily have to be performed by using the CPU 40 and the storage section 41 in the molecular detection device 100, and may be performed by externally attached hardware. Alternatively, data processing, calculation and analysis may be performed using cloud computing via a network. In that case, the molecular detection device 100 may include a data transmission section and a data reception section (not shown).

As described above, the molecular detection device according to the present embodiment includes the molecular sensor according to the first embodiment, and can detect a target molecule. Since the molecular sensor according to the first embodiment is provided, a molecular detection device which has improved sensitivity and selectivity and can be easily reused is realized.

EXAMPLES

Hereinafter, an example in which a QCM molecular sensor including the sensitive film of the present embodiment is manufactured and a target molecule is detected using the QCM molecular sensor will be described.

Example 1

(Preparation of UIO-66 Precursor Solution)

A precursor solution was prepared by weighing 18.6 mg of $ZrOCl_2 \cdot 8H_2O$, 9.5 mg of benzenedicarboxylic acid, 280 mg of acetic acid, and 9.4 g of dimethylformamide, and mixing them.

(Coating Film Formation on QCM)

QCM having a resonance frequency of 20 MHz was used. As a base layer, a layer obtained by stacking a 10 nm Ti layer and a 100 nm $SiO_2$ layer on one surface of QCM was used This QCM was ultrasonically cleaned with acetone and pure water respectively, further dried with an $N_2$ blower, and then placed in the center of a mini petri dish. The precursor solution described above was dropwise applied so as to spread over the entire QCM surface in an appropriate amount with the surface on which $SiO_2$ was formed as an upper surface. QCM was then left for 5 to 6 hours. The QCM was taken out and placed on a Teflon (registered trademark) block with sides of 1 cm.

(Crystal Growth)

A mixture solution having a volume ratio of acetic acid:dimethylformamide=4:21 was prepared in a container, and the Teflon (registered trademark) block having the QCM thereon was placed on the bottom of the container. Care was taken to avoid direct contact of the mixture solution in the container with the QCM on the Teflon (registered trademark) block, and the container was placed in an oven and heated at 100° C. for 3 hours. In this way, crystallization proceeded under a solvent atmosphere, and a thin film having micropores, mesopores, and macropores between UIO-66 particles was obtained. Further, the QCM was taken out from the container and heated on a hot plate in the atmosphere at 120° C. for 2 hours to remove excess solvent and moisture. In this way, a QCM on which UIO-66 was formed was obtained.

(Evaluation of Film Residual Property)

Optical microscope observation was performed before and after immersing the MOF film-formed QCM prepared in Example in pure water for 30 minutes to evaluate whether or not the MOF film was peeled off or dropped from the QCM. In Example 1, significant peeling or falling of the MOF film was not observed.

Hereinafter, also in Examples 2 and 3 and Comparative Examples 1 to 3, the film residual property was evaluated in the same manner, and the results are shown in Table 1. In Table 1, Examples in which peeling or detachment of the MOF film was not observed were indicated as S, and on the other hand, for Examples in which peeling or detachment was observed, the result of film residual property evaluation was described.

(Method for Measuring Thickness of Sensitive Film)

A method for measuring the thickness of a sensitive film formed by the method as described above will be described below. First, the film was confirmed at a low magnification such that the entire film entered the field of view, and the film was cut at a position where cracks, defects, ridges, foreign matters, and the like were not clearly and specifically present. Subsequently, the sensitive film was subjected to FIB processing using SMI3300SE manufactured by Hitachi, Ltd. or Strata 400s manufactured by FEI. Next, the cross section of the sensitive film was observed by STEM. When selecting an observation site, observation was performed at a magnification at which the entire region where the thin film was formed fell within the field of view as much as possible, and a site having the thickest film thickness was selected. However, when observing the entire film, a position where cracks, defects, ridges, foreign matters, and the like were clearly and specifically present was removed. Furthermore, the magnification was increased within a range where the film thickness of the selected site fell within the field of view, and observation was performed. Three cross sections of the sensitive films were selected by the above-described cross section selection method, each of the selected cross sections was imaged, and the thickness of the sensitive film was obtained by averaging the thicknesses of the sensitive films in each image.

The results of measuring the thickness of the sensitive film described above are shown in Table 1. Hereinafter, the cross sections were observed by STEM in Example 2, and by SEM in Example 3 and Comparative Examples 1 to 3.

(Method for Measuring Particle Size of MOF Particles)

Evaluation of the particle size was analyzed using an image captured by measuring the thickness of the sensitive film. The contour of the particle can be extracted by an image analysis software. The contour of the particle was extracted by ImageJ. When it was difficult to extract the contour of the particle by the method described above, a mapping image regarding an element (Zr, S, C, etc.) derived from a component of the MOF and the image captured above were compared by EDX to determine the size and shape of the particle, and then the particle size was calculated by ImageJ. The particle sizes in each Example calculated as described above are shown in Table 1.

(Measurement of Pore Distribution by Image Analysis)

Pore distribution was evaluated by binarizing the cross-sectional image used in the measurement of the thickness of the sensitive film using ImageJ as image processing software. In the present embodiment, as shown in FIG. 2B, a predetermined range avoiding an uneven portion in the vicinity of a substrate and an uneven portion on the outermost surface is cut out from the cross-sectional image as shown in FIG. 2A. At this time, the size of the cut image was set to an area corresponding to the square of the thickness of the sensitive film at the minimum. Binarization processing using ImageJ was performed to obtain a binarized image as shown in FIG. 2C. The pore area obtained from this image was converted into an equivalent circle diameter to obtain pore distribution. Here, the mapping image was imaged by EDX in the same range as the range in which the binarization processing was performed by ImageJ to confirm whether the binarization processing by ImageJ was correctly performed.

In the cross-sectional images at three different positions, the above-described cross sections were selected, and the pore distribution in each image was averaged. Hereinafter, the same procedures were performed in Examples 2 and 3 and Comparative Examples 1 to 3, and the results are shown in Table 1.

Example 2

(Preparation of Nanocolloid Solution of UIO-66)

With reference to Literature 3, UIO-66 was synthesized under the condition that the average particle size was 17 nm (2. EXPERIMENTAL SECTION) in the same paper. (Literature 3: William Morris et al, ACS Appl. Mater. Interfaces 2017, 9, 33413-33418 "Role of Modulators in Controlling the Colloidal Stability and Polydispersity of the UiO-66 Metal-Organic Framework") Specifically, first, $ZrOCl_2 \cdot 8H_2O$ (210 mg) was dissolved in 30 ml of dimethylformamide (DMF) to prepare a stock solution of $ZrOCl_2 \cdot 8H_2O$. Next, a second stock solution containing benzenedicarboxylic acid (500 mg) in 10 ml of DMF was prepared. Subsequently, the stock solution of $ZrOCl_2 \cdot 8H_2O$ (3 ml) was added to the benzenedicarboxylic acid stock solution (1 ml) in a 10 ml scintillation vial. Furthermore, acetic acid was added dropwise so as to be 1.2 M. The solution was heated at 90° C. for 18 hours to synthesize UIO-66 microparticles. These crystal particles were redispersed in dimethylformamide to obtain a 0.2 wt % dispersion solution.

Using the same type of QCM and the same cleaning method as those in Example 1, a QCM on which UIO-66 was formed was obtained. Thereafter, the film thickness residual evaluation was performed in the same manner as in Example 1, but significant peeling or falling of the MOF film was not observed.

Example 3

(Preparation of UIO-67 Precursor Solution)

A precursor solution was prepared by weighing 18.6 mg of $ZrOCl_2 \cdot 8H_2O$, 280 mg of acetic acid, 13.9 mg of biphenyldicarboxylic acid, and 9.4 g of dimethylformamide, and mixing them.

A QCM on which UIO-67 was formed was obtained in the same manner as in Example 1 except that the precursor solution thus obtained was used. Thereafter, the film thickness residual evaluation was performed, but as in Example 1, significant peeling or falling of the MOF film was not observed.

Comparative Example 1

The precursor solution used in Example 3 was left, and nanoparticles were precipitated in a sample container. Using this precursor solution in the same manner as in Example 1, a QCM on which UIO-67 was formed was obtained. Thereafter, the film thickness residual evaluation was performed in the same manner as in Example 1, and peeling of a film peripheral portion was partially observed.

Comparative Example 2

With reference to (Non Patent Literature 3), UIO-66 was synthesized under the condition that the average particle diameter was 270 nm in the same paper. These crystal particles were dispersed in dimethylformamide to obtain a 0.2 wt % dispersion solution. Coating film formation on QCM was performed in the same manner as in Example 2 to obtain a QCM on which UIO-66 was formed. However, the film was very uneven and had low density, portions where large aggregates were present and portions where the base was exposed were mixed, and the film thickness and the pore distribution could not be evaluated. Although oscillation was attempted, the oscillation resistance increased and oscillation could not be performed. In the same film residual property evaluation as in Example 1, peeling and falling of the film were observed around sites where the aggregates were present.

Comparative Example 3

A UIO-66 film-formed QCM was obtained in the same manner as in Example 2. Since large cracks were generated throughout the film, the pore distribution could not be evaluated. Although oscillation was attempted, the oscillation resistance increased and oscillation could not be performed. In addition, in the same film residual property evaluation as in Example 1, peeling and falling of the film were observed around the crack portions.

(Sensitivity Evaluation)

The MOF film-formed QCM of the present example was connected to a PC using a portable QCM measuring instrument (THQ-100P-SW type) manufactured by TAMADE-VICE Co., Ltd. As a method for simply evaluating sensitivity to VOC, the following method was used. The tip of a cotton swab immersed in a toluene solution to be wet was brought close to the sensitive film surface of QCM at a distance of several mm for 5 seconds, and the frequency change was read. The evaluation environment was in an atmosphere at about 20° C. and 60% RH. When the frequency change amount per unit film thickness is defined as sensitivity from frequency change amount X and thickness Y of the sensitive film read by the above method, the sensitivity is represented by X/Y, and thus the sensitivity of the MOF film-formed QCM in each Example was calculated by the above. The results are shown in Table 1.

TABLE 1

| | MOF Type | Particle size (nm) | Film thickness (nm) | $S_{me}/(S_{mi}+S_{me}+S_{ma})$ | $(S_{mi}+S_{me}+S_{ma})/S_{total}$ | $S_{ma}/(S_{mi}+S_{me}+S_{ma})$ | Sensitivity (Hz/nm) | Film residual property |
|---|---|---|---|---|---|---|---|---|
| Example 1 | UIO-66 | 16 | 650 | 0.93 | 0.117 | 0.07 | 12.0 | ○ |
| Example 2 | UIO-66 | 10 | 250 | 0.75 | 0.125 | 0.24 | 10.0 | ○ |
| Example 3 | UIO-67 | 45 | 420 | 0.37 | 0.08 | 0.63 | 7.1 | ○ |
| Comparative Example 1 | UIO-67 | 63 | 320 | 0.26 | 0.065 | 0.74 | 3.7 | Partial peeling |
| Comparative Example 2 | UIO-66 | 300 | — | — | — | — | — | Peeling and detachment |
| Comparative Example 3 | UIO-66 | 10 | 11000 | — | — | — | — | Peeling and detachment |

In Comparative Example 1, the pore distribution of pores formed by a plurality of MOF particles does not satisfy $0.35 \leq S_{me}/(S_{mi}+S_{me}+S_{ma})$, and $0.01 \leq S_{mi}+S_{me}+S_{ma})/S_{total} \leq 0.5$, and the sensitivity as a molecular sensor is lower than that in Examples 1 to 3. From this, comparison between Examples 1 to 3 and Comparative Example 1 shows that when pores exist between MOF particles, the pores are any of micropores, mesopores, and macropores, and the pore distribution calculated from the equivalent circle diameter by two-dimensional image analysis is $0.35 \leq S_{me}/(S_{mi}+S_{me}+S_{ma})$ and $0.01 \leq (S_{mi}+S_{me}+S_{ma})/S_{total} \leq 0.5$, the sensitivity as a molecular sensor can be improved.

In the QCM prepared in Comparative Examples 2 and 3, as described above, the thickness of the sensitive film was unmeasurable, and the sensitive film did not oscillate.

Also in the film thickness residual evaluation described above, significant peeling or falling of the MOF film was not observed in Examples 1 to 3, whereas peeling or detachment of the film was observed in Comparative Examples 1 to 3.

By comparison between Examples 1 to 3 and Comparative Example 2, when the particle size of the MOF particles is 5 nm or more and 100 nm or less, formation of macropores is suppressed from being dominant, and a cohesive force acting between the MOF particles can be increased. It can be seen that this makes it possible to increase the physical strength of the MOF film, and thus peeling or detachment of the MOF film was not observed in Examples 1 to 3.

Comparison between Examples 1 to 3 and Comparative Example 3 shows that when the sensitive film has a thickness of 10 nm or more and 10 μm or less, an increase in oscillation resistance when combined with QCM can be suppressed.

From the comparison of Examples 1 to 3, it was found that the sensitivity as a molecular sensor can be improved as $S_{me}/(S_{mi}+S_{me}+S_{ma})$ and $(S_{mi}+S_{me}+S_{ma})/S_{total}$ increase. This is because it means that the ratio of pores in the sensitive film is large by increasing the two ratios described above and the number of mesopores is large among the pores, and thus transport and diffusion of the target molecule into the film are promoted.

While certain embodiments have been described, these embodiments have been presented by way of example only, and are not intended to limit the scope of the inventions. Indeed, the novel embodiments described herein may be embodied in a variety of other forms; furthermore various omissions, substitutions, and changes in the form of the embodiments described herein may be made without departing from the spirit of the inventions. The accompanying claims and their equivalents are intended to cover such embodiments or modifications as would fall within the scope and spirit of the inventions.

Hereinafter, some aspects according to the embodiment will be described.

[1] A molecular sensor including:
a sensitive film including a plurality of metal organic framework particles; and
a detector configured to be capable of measuring a change in physical quantity due to adsorption of a target molecule to the sensitive film, in which pores are present between the plurality of metal organic framework particles, the pores are any of mesopores of 2 nm or more and 50 nm or less, micropores smaller than the mesopores, and macropores larger than the mesopores, and
when a sum of areas of the micropores is defined as $S_{mi}$, a sum of areas of the mesopores is defined as $S_{me}$, a sum of areas of the macropores is defined as $S_{ma}$, and an area of an entire image analysis area is defined as $S_{total}$, in an image analysis area by two-dimensional image analysis on a cross section of the sensitive film in a thickness direction,
pore distribution by the two-dimensional image analysis satisfies $$0.35 \leq S_{me}/(S_{mi}+S_{me}+S_{Ma}),$$

$$0.01 \leq S_{mi}+S_{me}+S_{ma})/S_{total} < 0.5.$$

[2] The molecular sensor according to [1], in which the pore distribution by the two-dimensional image analysis further satisfies $S_{ma}/(S_{mi}+S_{me}+S_{ma})<0.65$.

[3] The molecular sensor according to [1] or [2], in which the metal organic framework particles have a particle size of 5 nm or more and 100 nm or less.

[4] The molecular sensor according to any one of [1] to [3], in which the sensitive film has a thickness of 10 nm or more and 10 µm or less.

[5] The molecular sensor according to any one of [1] to [4], in which the metal organic framework contains Zr (zirconium).

[6] The molecular sensor according to any one of [1] to [5], in which the metal organic framework has a structure in which dicarboxylic acids coordinate to a hexanuclear $Zr_6O_4(OH)_4$ cluster.

[7] The molecular sensor according to any one of [1] to [6], in which the metal organic framework is at least one of UIO-66, UIO-67, UIO-68, and derivatives thereof.

[8] The molecular sensor according to any one of [1] to [7], further including a temperature adjustment device configured to heat the sensitive film.

[9] The molecular sensor according to any one of [1] to [8], in which the detector includes any one of measurement devices using a quartz crystal microbalance, a micro cantilever, or surface acoustic wave.

[10] A molecular detection device configured to detect the target molecule, including the molecular sensor according to any one of [1] to [9].

[11] The molecular detection device according to [10], including a plurality of the molecular sensors, in which the plurality of the molecular sensors includes at least sensors in which crystal structures of the metal organic framework particles of the sensitive films are different from each other.

[12] The molecular detection device according to [10], further including a plurality of the molecular sensors, in which the plurality of the molecular sensors include at least one sensor in which crystal structures of the metal organic framework particles of the sensitive films are the same, and combinations of types and/or amount ratios of metal ions included in the metal organic framework particles and organic ligands connecting the metal ions are different from each other.

[13] The molecular detection device according to [10], in which a plurality of the molecular sensors, in which the plurality of the molecular sensors include at least sensors in which crystal structures of the metal organic framework particles of the sensitive films and combinations of types and/or amount ratios of metal ions included in the metal organic framework particles and organic ligands connecting the metal ions are the same, and particle sizes of the metal organic framework particles are different from each other.

[14] The molecular detection device according to [10], further including a plurality of the molecular sensors, in which the plurality of the molecular sensors includes at least sensors in which crystal structures of the metal organic framework particles of the sensitive films, combinations of types and/or amount ratios of metal ions included in the metal organic framework particles and organic ligands connecting the metal ions, and particle sizes of the metal organic framework particles are the same, and the pore distributions are different from each other.

[15] The molecular detection device according to any one of [10] to [14], further including a processing device, in which the processing device is configured to determine a type and/or amount of the target molecule by combining a plurality of change amounts of the physical quantities obtained from the respective molecular sensors and recognizing the combined change amounts as a pattern.

[16] A molecular detection method including:
bringing a target molecule into contact with a sensitive film containing a plurality of metal organic framework particles;
measuring a change in physical quantity of the sensitive film due to adsorption of the target molecule to the sensitive film; and
determining a type or amount of the target molecule from a result of the measurement, in which pores are present between the plurality of metal organic framework particles, the pores are any of mesopores of 2 nm or more and 50 nm or less, micropores smaller than the mesopores, and macropores larger than the mesopores, and
when a sum of areas of the micropores is defined as $S_{mi}$, a sum of areas of the mesopores is defined as $S_{me}$, a sum of areas of the macropores is defined as $S_{ma}$, and an area of an entire image analysis area is defined as $S_{total}$, in an image analysis area by two-dimensional image analysis on a cross section of the sensitive film in a thickness direction,
pore distribution by the two-dimensional image analysis satisfies $$0.35 \leq S_{me}/(S_{mi}+S_{me}+S_{ma}),$$

$$0.01 \leq S_{mi}+S_{me}+S_{ma})/S_{total} \leq 0.5.$$

[17] The molecular detection method according to [16], in which the pore distribution by the two-dimensional image analysis further satisfies $S_{ma}/(S_{mi}+S_{me}+S_{ma}) \leq 0.65$.

[18] The molecular detection method according to [16], in which the bringing the target molecule into contact with the sensitive film and the measuring are performed using a plurality of the sensitive films in which crystal structures of the metal organic framework particles are different from each other, and in the determining, a type and/or amount of the target molecule is determined by combining change amounts of the physical quantities of the sensitive films and recognizing the combined change amounts as a pattern.

[19] The molecular detection method according to [16], in which the bringing the target molecule into contact with the sensitive film and the measuring are performed using a plurality of the sensitive films in which crystal structures of the metal organic framework particles are the same and combinations of types and/or amount ratios of metal ions included in the metal organic framework particles and organic ligands connecting the metal ions are different from each other, and in the determining, a type and/or amount of the target molecule is determined by combining change amounts of the physical quantities of the sensitive films and recognizing the combined change amounts as a pattern.

[20] The molecular detection method according to [16], in which the bringing the target molecule into contact with the sensitive film and the measuring are performed using a plurality of the sensitive films in which crystal structures of the metal organic framework particles and combinations of types and/or amount ratios of metal ions included in the metal organic framework particles and organic ligands connecting the metal ions are the same, and particle sizes of the metal organic framework particles are different from each other, and in the determining, a type and/or amount of the target molecule is determined by combining change amounts of the physical quantities of the sensitive films and recognizing the combined change amounts as a pattern.

[21] The molecular detection method according to [16], in which the bringing the target molecule into contact with the sensitive film and the measuring are performed using a plurality of the sensitive films in which crystal structures of the metal organic framework particles, combinations of types and/or amount ratios of metal ions included in the metal organic framework particles and organic ligands connecting the metal ions, and particle sizes of the metal organic framework particles are the same, and the pore distributions are different from each other, and in the determining, a type and/or amount of the target molecule is determined by combining change amounts of the physical quantities of the sensitive films and recognizing the combined change amounts as a pattern.

[22] The molecular detection method according to any one of [16] to [21], further including heating the sensitive film after the measuring to remove the target molecule from the sensitive film.

What is claimed is:

1. A molecular sensor comprising:
   a sensitive film including a plurality of metal organic framework particles; and
   a detector configured to be capable of measuring a change in physical quantity due to adsorption of a target molecule to the sensitive film,
   wherein pores are present between the plurality of metal organic framework particles, the pores are any of mesopores of 2 nm or more and 50 nm or less, micropores smaller than the mesopores, and macropores larger than the mesopores, and
   when a sum of areas of the micropores is defined as $S_{mi}$, a sum of areas of the mesopores is defined as $S_{me}$, a sum of areas of the macropores is defined as $S_{ma}$, and an area of an entire image analysis area is defined as $S_{total}$, in an image analysis area by two-dimensional image analysis on a cross section of the sensitive film in a thickness direction,
   pore distribution by the two-dimensional image analysis satisfies $0.35 \leq S_{me}/(S_{mi}+S_{me}+S_{ma})$, $0.01 \leq (S_{mi}+S_{me}+S_{ma})/S_{total} \leq 0.5$.

2. The molecular sensor according to claim 1, wherein the pore distribution by the two-dimensional image analysis further satisfies $S_{ma}/(S_{mi}+S_{me}+S_{ma}) \leq 0.65$.

3. The molecular sensor according to claim 1, wherein the metal organic framework particles have a particle size of 5 nm or more and 100 nm or less.

4. The molecular sensor according to claim 1, wherein the sensitive film has a thickness of 10 nm or more and 10 μm or less.

5. The molecular sensor according to claim 1, wherein the metal organic framework contains Zr (zirconium).

6. The molecular sensor according to claim 1, wherein the metal organic framework has a structure in which dicarboxylic acids coordinate to a hexanuclear $Zr_6O_4(OH)_4$ cluster.

7. The molecular sensor according to claim 1, wherein the metal organic framework is at least one of UIO-66, UIO-67, UIO-68, and derivatives thereof.

8. The molecular sensor according to claim 1, further comprising a temperature adjustment device configured to heat the sensitive film.

9. The molecular sensor according to claim 1, wherein the detector comprises any one of measurement devices using a quartz crystal microbalance, a micro cantilever, or surface acoustic wave.

10. A molecular detection device configured to detect the target molecule, comprising the molecular sensor according to claim 1.

11. The molecular detection device according to claim 10, comprising a plurality of the molecular sensors, wherein the plurality of the molecular sensors includes at least sensors in which crystal structures of the metal organic framework particles of the sensitive films are different from each other.

12. The molecular detection device according to claim 10, comprising a plurality of the molecular sensors, wherein the plurality of the molecular sensors include at least one sensor in which crystal structures of the metal organic framework particles of the sensitive films are the same, and combinations of types and/or amount ratios of metal ions included in the metal organic framework particles and organic ligands connecting the metal ions are different from each other.

13. The molecular detection device according to claim 10, comprising a plurality of the molecular sensors, wherein the plurality of the molecular sensors include at least sensors in which crystal structures of the metal organic framework particles of the sensitive films and combinations of types and/or amount ratios of metal ions included in the metal organic framework particles and organic ligands connecting the metal ions are the same, and particle sizes of the metal organic framework particles are different from each other.

14. The molecular detection device according to claim 10, comprising a plurality of the molecular sensors, wherein the plurality of the molecular sensors includes at least sensors in which crystal structures of the metal organic framework particles of the sensitive films, combinations of types and/or amount ratios of metal ions included in the metal organic framework particles and organic ligands connecting the metal ions, and particle sizes of the metal organic framework particles are the same, and the pore distributions are different from each other.

15. The molecular detection device according to claim 10, further comprising a processing device, wherein the processing device is configured to determine a type and/or amount of the target molecule by combining a plurality of change amounts of the physical quantities obtained from the respective molecular sensors and recognizing the combined change amounts as a pattern.

16. A molecular detection method comprising:
bringing a target molecule into contact with a sensitive film containing a plurality of metal organic framework particles;
measuring a change in physical quantity of the sensitive film due to adsorption of the target molecule to the sensitive film; and
determining a type or amount of the target molecule from a result of the measurement,
wherein pores are present between the plurality of metal organic framework particles, the pores are any of mesopores of 2 nm or more and 50 nm or less, micropores smaller than the mesopores, and macropores larger than the mesopores, and
when a sum of areas of the micropores is defined as $S_{mi}$, a sum of areas of the mesopores is defined as $S_{me}$, a sum of areas of the macropores is defined as $S_{ma}$, and an area of an entire image analysis area is defined as $S_{total}$, in an image analysis area by two-dimensional image analysis on a cross section of the sensitive film in a thickness direction,
pore distribution by the two-dimensional image analysis satisfies $$0.35 \leq S_{me}/(S_{mi}+S_{me}+S_{ma}),$$

$$0.01 \leq (S_{mi}+S_{me}+S_{ma})/S_{total} \leq 0.5.$$

17. The molecular detection method according to claim 16, wherein the bringing the target molecule into contact with the sensitive film and the measuring are performed using a plurality of the sensitive films in which crystal structures of the metal organic framework particles are different from each other, and in the determining, a type and/or amount of the target molecule is determined by combining change amounts of the physical quantities of the sensitive films and recognizing the combined change amounts as a pattern.

18. The molecular detection method according to claim 16, wherein the bringing the target molecule into contact with the sensitive film and the measuring are performed using a plurality of the sensitive films in which crystal structures of the metal organic framework particles are the same and combinations of types and/or amount ratios of metal ions included in the metal organic framework particles and organic ligands connecting the metal ions are different from each other, and in the determining, a type and/or amount of the target molecule is determined by combining change amounts of the physical quantities of the sensitive films and recognizing the combined change amounts as a pattern.

19. The molecular detection method according to claim 16, wherein the bringing the target molecule into contact with the sensitive film and the measuring are performed using a plurality of the sensitive films in which crystal structures of the metal organic framework particles and combinations of types and/or amount ratios of metal ions included in the metal organic framework particles and organic ligands connecting the metal ions are the same, and particle sizes of the metal organic framework particles are different from each other, and in the determining, a type and/or amount of the target molecule is determined by combining change amounts of the physical quantities of the sensitive films and recognizing the combined change amounts as a pattern.

20. The molecular detection method according to claim 16, wherein the bringing the target molecule into contact with the sensitive film and the measuring are performed using a plurality of the sensitive films in which crystal structures of the metal organic framework particles, combinations of types and/or amount ratios of metal ions included in the metal organic framework particles and organic ligands connecting the metal ions, and particle sizes of the metal organic framework particles are the same, and the pore distributions are different from each other, and in the determining, a type and/or amount of the target molecule is determined by combining change amounts of the physical quantities of the sensitive films and recognizing the combined change amounts as a pattern.

* * * * *